(12) United States Patent
Baker

(10) Patent No.: US 6,278,455 B1
(45) Date of Patent: *Aug. 21, 2001

(54) PICTORIAL INTERFACE FOR ACCESSING INFORMATION IN AN ELECTRONIC FILE SYSTEM

(76) Inventor: Michelle Baker, 325 Riverside Dr., Apt #123, New York, NY (US) 10025

( * ) Notice: Subject to any disclaimer, the term of this patent is extended or adjusted under 35 U.S.C. 154(b) by 0 days.

This patent is subject to a terminal disclaimer.

(21) Appl. No.: 09/459,934

(22) Filed: Dec. 13, 1999

Related U.S. Application Data

(63) Continuation of application No. 09/003,553, filed on Jan. 6, 1998, now Pat. No. 6,002,401, which is a continuation of application No. 08/316,518, filed on Sep. 30, 1994, now Pat. No. 5,715,416.

(51) Int. Cl.[7] .................................................. G06F 3/14
(52) U.S. Cl. ........................... 345/349; 345/335; 345/473
(58) Field of Search ..................................... 345/348, 349, 345/350, 351, 346, 356, 357, 335, 977, 968, 302, 113, 115, 121, 473, 435

(56) References Cited

U.S. PATENT DOCUMENTS

| | | | |
|---|---|---|---|
| 4,601,003 | * 7/1986 | Yoneyama et al. | 345/351 |
| 5,021,976 | * 6/1991 | Wexelblat et al. | 345/356 |
| 5,241,671 | * 8/1993 | Reed et al. | 707/104 |
| 5,347,628 | * 9/1994 | Brewer et al. | 345/351 |
| 5,349,658 | * 9/1994 | O'Rourke et al. | 345/349 |
| 5,361,173 | * 11/1994 | Ishii et al. | 360/27 |
| 5,394,521 | * 2/1995 | Henderson, Jr. et al. | 345/346 |
| 5,442,736 | * 8/1995 | Cummins | 345/434 |
| 5,479,602 | * 12/1995 | Baecker et al. | 345/349 |
| 5,524,195 | * 6/1996 | Clanton, III et al. | 345/327 |
| 5,657,462 | * 8/1997 | Brouwer et al. | 345/336 |
| 5,682,469 | * 10/1997 | Linnett et al. | 345/473 |

OTHER PUBLICATIONS

*The Complete HyperCard 2.0 Handbook*, 3rd Edition, Danny Goodman, Aug. 1990, pp. 165–168; 170–172; 313–319; and 400–402.

\* cited by examiner

*Primary Examiner*—Crescelle N. dela Torre
(74) *Attorney, Agent, or Firm*—David P. Gordon; David S. Jacobson; Thomas A Gallagher

(57) ABSTRACT

A pictorial user interface for accessing information in an electronic file system provides a pictorial image which is linked to a file directory and which identifies the file directory. Objects in the pictorial image are icons linked to file objects and an animated character is overlaid on the pictorial image. User input causes movement of the animated character relative to the pictorial image. Input from the user is preferably through a limited input device such as a gamepad controller, a mouse, or by using a limited number of keys on a normal keyboard. Input signals are mapped according to keycode identical command sets, context arguments and selection arguments. Commands that can be invoked by the user include operating system commands, pictorial object commands, and interface utility commands. Using the pictorial object commands, the user can configure the interface so that different pictures and icons are associated with different directories and files. Commands are executed with a prologue animation and an epilogue animation. The prologue animation provides feedback as to the nature of the command being executed. The epilogue animation provides feedback as to the results of the command. Animations may include actions of the animated character or the behaviour of a selected icon, or both. The interface may be applied as an overlay to virtually any operating system.

11 Claims, 18 Drawing Sheets

Microfiche Appendix Included
(1 Microfiche, 81 Pages)

PICTORIAL INTERFACE FOR ACCESSING INFORMATION IN AN ELECTRONIC FILE SYSTEM

This application is a continuation of Ser. No. 09/003,553, filed Jan. 6, 1998, now U.S. Pat. No. 6,002,401 which is a continuation of Ser. No. 08/316,518, filed Sep. 30, 1994, now U.S. Pat. No. 5,715,416.

This application includes a Microfiche Appendix containing computer source code. The Microfiche Appendix consists of 1 sheet having a total of 81 frames.

BACKGROUND OF THE INVENTION

1. Field of the Invention

The invention relates to a graphical user interface for accessing information stored in a computer. More particularly, the invention relates to a user definable graphical interface for a computer operating system which utilizes pictorial information and animation as well as sound.

2. State of the Art

Very early computers were provided with a minimal interface which often consisted of little more than switches and lights. Rows of switches were set in positions representing binary numbers to provide input and rows of lights were illuminated representing binary numbers to provide output. Eventually, computer input and output included text and decimal numbers, which were input using punch cards and output using line printers. A major advance in computing was the interactive video display terminal (VDT). Early VDTs displayed several lines of alphanumeric characters and received input from a "QWERTY" keyboard. VDTs were a great improvement over switches and lights and even over punch cards and line printers.

As computers became more complex, it became necessary to systematize the manner in which information was stored and retrieved. The hierarchical file system was developed and is still substantially the only system in use today with a few exceptions. Under the hierarchical file system, information is stored in files and files are stored in directories. Directories may be stored in other directories and called sub-directories. Using this system, any file can be located by using a path name which identifies the path from a root directory through one or more subdirectories to the file; e.g., a typical path name may take the form: "rootdirectory/directory/subdirectory/filename".

In addition to the development of the hierarchical file system was the development of various "operating systems". The early computers did not require an "operating system" per se. They were manually programmed to perform a single task and then reprogrammed for a different task. Programs were stored on punch cards or tape and were loaded directly into the computer's random access memory (RAM) individually when needed by a system operator. With the development of various file systems, including the hierarchical file system, various programs and data could be stored on the same medium and selected for loading into the computer's random access memory (RAM). An operating system is a program which is used to access information on a storage medium and load it into RAM. The operating system allows the computer user to display the contents of directories and choose programs to be run and data to be manipulated from the contents of the directories. Every operating system, therefore, has a user interface, i.e. a manner of accepting input from a user and a manner of displaying output to a user. The input typically includes commands to the operating system to find information in directories, to display the contents of directories, to select files in directories for execution by the computer, etc. In addition, operating systems provide means for the user to operate on files by moving them, deleting them, copying them, etc. Output from the operating system typically includes displays of the contents of directories, displays of the contents of files, error messages when a command cannot be completed, confirmation messages when a command has been completed, etc. With many operating systems, when a program is selected for execution through the operating system, the selected program takes over control of the computer and returns control to the operating system when the program is ended. Modern operating systems share control with programs and several programs can run while the operating system is running.

The most primitive operating system interface is known as a "command line interface". While this type of interface is not necessarily indicative of a primitive operating system, it is primitive as an interface. The command line interface is purely text and presents the user with an arbitrary "prompt" such as "C:\" or "%\:". The only information conveyed to the user by the command line prompt is that the operating system is ready to receive a command, and in the case of "C:\", that the operating system will perform commands with reference to the currently selected root directory "C". The commands to which the operating system will respond are most often obscure abbreviations like DIR to display the contents of the currently selected directory and CD to select a different directory. Moreover, the responses provided by the operating system interface to commands such as DIR may be equally obscure such as displaying a rapidly scrolling list of directory contents or the cryptic "Abort, Retry, Fail" message. Thus, in order to explore the contents of a file system using a command line interface, the user must repeatedly type DIR and CD and try to remember how the scrolling lists of filenames relate to each other in the hierarchy of the file system. Most users find this to be a tedious and trying experience.

More recently, the command line interface has been abandoned in favor of a fully graphical user interface ("GUI") such as those provided by the Apple Macintosh operating system and the IBM OS/2 operating system. To date, GUI interfaces to the operating system have been "WIMP" interfaces; that is they use Windows, Icons, Menus, and Pointers. In the development of WIMP interfaces, a central issue has been the organization of information for display on a the limited viewspace provided by a computer monitor. This issue has bee?r addressed by using the metaphor of a messy desktop to guide the design and layout of information on the graphical display. The metaphor of a messy desktop, which arose in the research on Rooms, and more recently 3-D Rooms, has become universal as an organizing paradigm for the display of user interactions with a computer operating system. In addition to the Macintosh and OS/2 operating systems interfaces, Unix systems X-windows, Microsoft Windows, and others are based on this metaphor. In a WIMP interface, windows are used to demarcate regions of the display assigned to individual programs, graphical icons are used to represent objects such as files and directories known to the operating system, menus can be displayed to list text string names of available operations, and a pointing cursor is used to select object icons or menu items that are visible on the display.

Graphical layouts provided by movable windows,icons, and menus of the WIMP interface have been very successful in helping to organize information, particularly data from alternative programs in progress, on a computer display.

Nevertheless, they are offer limited functionality for depiction of operating system procedures and for graphical information about the files and directories present in the file system. Most computer users find the graphical interface to be much easier to learn and much easier to use than the command line interface. Many people have described the graphical interface as "intuitive". However, some people do not find it so intuitive and need more time to learn how to use it than do others.

Despite their vastly enhanced use compared to command line interfaces, the graphical interfaces presently used for access to operating system functionality are still somewhat regimented. For example, the icons are typically all rectangular and of the same size, e.g. 32 by 32 pixels. They are also generally generic. That is to say, for example, that a document concerning the subject of elephants would have the same icon as a document concerning the subject of roses. Typically, all of the directory icons are identical graphics of a folder with no graphical indication of what the folders contain either in subject matter or in amount of information. A folder containing one file has the same size and shape icon as a folder containing twenty files. Thus file and folder icons must always be accompanied by a text string for identification. Moreover, all the windows drawn in the GUI are identical except for the text string which typically appears in the window's title bar. Thus there is no graphical information presented to inform the user what directory is being viewed. The user must read the title bar and remember the association between the text string and the directory contents to determine what directory is being viewed.

There have been a number of extensions to the early WIMP interfaces to improve the ability of users to associate icons to meaningful objects or actions. It is possible for the user to customize icons, by cutting and pasting graphics or by drawing an icon with an icon editor. However, the process is often tedious and the result is not always informative. The only icon editing software presently available which automatically enhances the informative nature of an icon are the programs which create thumbnail graphic icons for graphic files. With these programs, a file which contains a picture of an elephant, for example, will be provided with an icon which is a miniature version of the elephant picture. Since these programs do not apply to files made up of text or for executable program, they do not provide a general solution to the problem of indistinguishable graphic icons.

Even for software application developers it is becoming increasingly difficult to design meaningful graphical icons that satisfy the constraints imposed by existing WIMP interfaces and that are different from those already in use. One approach to the problem of designing meaningful graphics for icons has been to work with animated and multidimensional icons. It is believed that animations can be used to improve the expressiveness and extend the amount of information that can be conveyed in an icon. Some of this research has been incorporated into existing operating system interfaces, particularly for generic process depiction. For example, when an operation on a file is performed or a program is opened, the mouse pointer may become momentarily animated or may assume a different graphic, e.g. by displaying an hourglass. However, there are serious limitations on the use of animated icons in current operating systems interfaces. First, they are only possible for cursor animations. It is not currently possible, even for application developers, to supply animated icons for file objects because existing operating system interfaces do not provide support for such icons. Second, cursor animations are constructed by operating system developers and fixed in the operating system. Software developers can make use of alternative cursor animations but they must select a cursor animation from the small set of choices that are included with the operating system. The set of animated icons is fixed and finite.

Another regimented aspect of the current graphical interfaces is that they are relatively static. With a few exceptions, such as the animated cursors described above or the zooming open of windows, the graphical display is inanimate. While the operating system interface presents a static graphical representation of objects such as files and directories, there is not much graphical representation of processes performed by the operating system. Thus, as the user initiates a process (such as copying a file or launching a program, etc.) there is no intuitive indication by the operating system to the user as to what is happening. For example, the hourglass animation of the mouse cursor may indicate that the operating system or program is performing some function but there is no indication of what that function is. Moreover, even animations such as the hourglass or zooming of windows that are indicative of processes, cannot be used for graphical display of interactions with the representations of objects such as files and directories known to the operating system. This is another result of the fact that animations displayed by the operating system interface must be constructed in advance by software developers.

Another difficulty with WIMP interfaces for the operating system arises in the use of menus for the selection and execution of most operating system commands. For many users, this is an improvement over the old command line interfaces in which a user had to remember the correct text string identifier and avoid typing or spelling errors in order to invoke a command. However, the need to traverse menus in order to locate the correct mouse responsive text string for a command is a nuisance for many computer users. It generally requires that the mouse pointer be moved away from the workspace and that a number of hierarchically organized lists be scanned for the desired command. Although accelerator key sequences are normally available for command selection, most computer users find them difficult to learn and use. This is because they normally require that a control key be used in conjunction with another key. A user is forced to remove the hand from the mouse to press keys, an action that tends to disrupt the orientation of the mouse pointer and require recalibration of hand and eye in order to resume work with the mouse.

Recently, software developers have created application programs that allow a user to configure an alternative desktop interface to the ones provided by standard operating systems. These programs extend the underlying representation of an icon and allow icon graphics to be different sizes and shapes from the standard 32 by 32 pixel icons available in the usual operating system interface. They do this by requiring that users select icons from a large set provided by the interface developers. Edmark's KidDesk is an example of such a program that extends the desktop metaphor for use by young children. The software can be set up to provide young children with access to a small set of programs. Like windows-based software for adults, it is limited to a single graphical view, and a set of predesignated icons.

The handling of user interaction with and display of the files and directories that make up the computer's file system is a central function of any operating system interface. As noted earlier, command line interfaces which required a user to repeatedly invoke a sequence of commands like DIR and CD in order to examine the file system have been particularly difficult for users. Since it is so difficult and time consuming to navigate a file system using a command line interface, file system management programs were developed for hierarchical files systems. Most of these programs include a quasi-graphical representation of the file system "tree" so that the user can see at once (or in a few screens) how directories, subdirectories and files are organized relative to each other. File system management programs improve on the bare command line interface by continuously displaying command menus and/or file lists. The interface provided by these programs, however, is mainly text based. The user is forced to read listed information. With the exception of the actual text, all files and directories look the same, i.e. a line of text. Only the relative location of the lines of text in the hierarchical tree gives a clue as to how the files and directories are related.

WIMP interfaces for the operating system allow for improvements in the earlier file system management programs by enabling the use of separate windows for the display of directory contents and allowing some files to be executable when they are clicked on with a pointing device. In the Apple Macintosh, file system management is included as part of the operating system while Microsoft Windows and IBM's OS/2 include a similar File Manager program along with the basic operating system. In each of these systems, the user can explore and navigate through the file system by pointing and clicking on icons with the aid of a mouse or other pointing device. For example, in order to view the contents of a disk, the user would locate the mouse pointer on the icon of the disk and click the mouse button twice.

In the Macintosh, which offers the greatest functionality in file system management, the interface responds to mouse clicks by opening a window which contains icons representing directories and files contained on the disk. Beneath, or alongside, each icon is the name of the file or directory. When displayed in one mode, each icon resides on a line followed by the name of the file, the size of the file, the date it was modified, etc. By simply pointing and clicking the mouse, the user can rearrange the icon display alphabetically, chronologically, by size, etc. The icons remain visible on the screen until the user closes the window with an appropriate mouse click. If there are more icons than can be displayed on the screen, the window contents can be scrolled horizontally and vertically. This is much more useful than the directory list in a command line interface which scrolls quickly off the screen and cannot be scrolled backwards. Moreover, each of the directory icons will appear to respond to mouse clicks by displaying their contents either in another window, or in a hierarchical tree within the same window. Depending on the size of the display screen, the user may view the contents of several directories side by side. Files and directories can be moved or copied by clicking on their icons and dragging them onto the icon of the directory or disk to which they are to be copied or moved. This is much more convenient than typing "copy directory1\subdirectory1\filename directory2\subdirectory2\filename" to copy a file. Moreover, several icons can be selected by the mouse and dragged as a group to a new location. Files, groups of files, and entire directories are deleted by dragging them to a graphic icon that depicts a trash can. Files and/or groups of files can be opened, or programs executed, by clicking with the mouse. Some program icons may be responsive to "drag and drop" operations so that if a file icon is dropped onto the program icon, the program will perform some operation on the file.

Improvements in usability of WIMP based interfaces to the file system are mainly a result of the fact that better use is made of the computer monitor "real estate" to organize and display information about the relationships among directories and files. With these interfaces, computer users are able to view the file system structure in a few screens or windows. When necessary, the use of a pointing device makes it easy to switch among these windows to refresh one's memory and develop a complete mental picture of the file system structure. Because the capacity of storage devices such as hard disks and CD-ROMs is increasing and networked file systems are becoming prevalent, existing interfaces for file management are not able to effectively aid users attempting to manage or browse the enormous numbers of files now available to them. Very large numbers of windows must be opened to traverse a large file system and displays of directory trees have begun to require many screenfuls of text. When this is the case, graphical displays of the file system begin to resemble the old command line interfaces because it is no longer possible for a user to examine the file system structure in a small number of views.

There has recently been a great deal of research focused on improving the ability of users to organize, browse, and retrieve files from very large file systems. Advances in computer processing power and computer graphics have enabled the development of software tools that attempt to utilize the capacity of the human visual system for rapid processing of large volumes of information. Views, visual abstractions, and other information visualization techniques have been applied to the problem of finding and organizing files in a computer file system. For example, Cone Trees increase the amount of information (e.g. the number of files displayed) by extending diagrams similar to those provided by existing file management programs into three dimensions and adding animation (e.g. rotation of the trees). These techniques are based on the use of overviews and visual abstraction of directory structure. They may be useful for navigating a file system structure in which the files are either already known to the user or are easily describable by text string names. They do not offer much help to a user exploring unknown file systems such as would be found on a network because text string names are generally inadequate as descriptions of file or directory contents.

Abstraction oriented methods work by removing cues that are not directly relevant (e.g. by displaying only the structure of a file system). For these tools, operating system limitations on graphic icons described earlier are not a problem because small generic icons and/or text strings are the preferred representation for file system objects. A different approach to the problem users have locating and identifying files in a computer file system is to support the human proficiency in using unusual features of phenomenon to index and retrieve information. MEMOIRS, a file management tool designed for adults, uses this approach by providing facilities to trigger memory for events as cues in recognizing and indexing files. However, event based retrieval cues are even less useful than text string names when browsing an unfamiliar file system. None of these methods has made use of the known human capacity for making use of detailed visual information and the use of distinguishing visual detail for both recognition and recall. Presently exploration of unfamiliar file systems, learning file system structure, and retrieval of particular information from a file system must take place with few effective mnemonic cues. Moreover, it is not possible to utilize the power of complex, detailed images to convey information in order to orient and acquaint a user with the contents of an unfamiliar file system. While "a picture is worth a thousand words", explorers in cyberspace must contend with a two or three word description and, perhaps, a 32 by 32 pixel icon to indicate the contents of a directory or a file.

Existing interfaces for file management, like that of the Macintosh, have been designed in accordance with the desktop metaphor. The use of windows to demarcate different directory listings, text string descriptions of files and directories, and even the graphic icons of file folders and paper pages that denote directories and files have been constructed to resemble a desktop environment. While the desktop metaphor works well for task switching among applications, and the windows metaphor is suitable for applications in which text or numeric symbols are organized into separate documents, e.g. text processing or spreadsheets, for tasks in which traversal of a space is the predominant characteristic a "worlds" metaphor is more appropriate. Here the space can be organized in a graphical analogue to the physical world in which magical and physical properties can be intermixed to fit the task (Smith, 1987). One can move through the abstract space by physically traversing the graphical world represented on the computer display. In fact, the original research on Rooms was intended to convey the impression of an complete office environment which included a desktop workspace. In its development into the Macintosh operating system interface, it's scope was restricted to the desktop alone.

Recent advancements in computer graphics outside the realm of operating systems have enabled the development of highly intuitive application programs—particularly in the areas of education and entertainment. Much of this technology has been given the epithet of "multimedia" because it combines high resolution graphics, animation, video, and sound as well as ordinary text. There are now a large number of software application programs that use multimedia to create the impression of a complex "world" that can be traversed. In these applications, the user is presented with screens of graphical information. Each screen can have several hot spots that behave like operating system icons in that they respond to pointing and clicking of the mouse pointer. Typical actions in response to clicking on a hot spot include: displaying another screen of graphics, playing a sound, displaying an animation, displaying text, displaying a video, or a combination of these actions. Navigating a well designed hypertext application can give the impression of walking around in the real world. The user can look at where the user wants to go and go there by clicking the mouse pointer on an icon that points in that direction. The user can examine objects by pointing and clicking on them. The user can pick up objects, put them away, carry them, return to where the user started and go off in another direction. Some of these applications contain virtually no text at all and the user freely "walks" through thousands of graphic screens, views video clips and hears sounds along the way. For example, the user may enter through the door of a building by clicking the mouse pointer on the door and see many bookshelves inside. As the user approaches a bookshelf, by pointing the mouse pointer at the bookshelf and clicking the mouse button, titles of the books come. into view. The user may select a book by clicking the mouse pointer on the spine of the book and the book will open showing the contents of the book. Pages are turned forward or back by clicking the pointer on the corner or edge of the page to be turned.

Hypermedia applications that make use of a worlds metaphor appear to be particularly appealing to children. The worlds metaphor has been used widely and very successfully in video games and in educational software such as Broderbund's Treehouse and Myst. Recent worlds based programs, such as Knowledge Adventure's 3D Dinosaur Adventure, use three dimensional graphics to better convey the impression of movement through a realistic space. In addition to the games programs that are now commonplace, there has been research on applications to display pictures in a museum and other types of information.

In all these cases, the use of a worlds metaphor requires that the graphical world be constructed by an application developer. With the exception of the alternative desktop programs such as KidDesk, described earlier, hypermedia software applications are not intended to be used for general access to the file system and computer operating system. Users traverse the multimedia world designed by application developers by following hypermedia links or by moving a mouse pointer through a predefined three dimensional model. A user can not add information or extend the world except in limited predefined ways. A necessary feature for an interface to the computer operating system is to provide a user with the ability to add or remove file objects in the underlying file system and their representations in the interface. Alternative desktop programs solve this problem by using hypermedia technology to allow the user to select from a fixed and finite set of graphic icons to use as representations for their files or programs. As noted earlier, a user of alternative desktop programs can only use graphics that have been predefined by the application developers, graphic icons for files and directories are independent of the context in which they reside, that is, a fixed graphic background (or user selectable set of backgrounds) is provided by the application developer, and operating system actions are not represented at all. Moreover, apart from ordinary operating systems icons, it is not possible for a software applications developer to develop a graphical representation for a program that will be visible to the user of the alternative desktop program. Instead, the user of an alternative desktop must reinstall each new application program into the desktop by linking it to one of the icons included within the desktop software. Because users cannot make use of graphical icons and backdrops designed by the application developers for their programs, icons are likely to be even less representative of file and directory content than are the limited graphic icons and text string names available in an ordinary operating system interface.

User definable hot spots that respond to mouse clicks are provided by hypermedia authoring tools such as Apple's Hypercard, IBM's Linkway and AVC, Asymetrix' Toolbook, Macromedia Director, and others. Once defined, these hotspots behave like the icons in an operating system interface in that they respond to mouse clicks by executing an action. Unlike operating system icons, hot spots defined using a hypermedia authoring tool can be represented by any graphic and can be linked to any type of behavior. Authoring tools are intended to be full featured programming languages for development of multimedia applications. In addition to allowing the definition of mouse responsive hot spots, they generally offer features including the display of raster graphic images, animation, video and sound playback, control over synchronization of sound and animation or video, and the ability to link hot spots to actions including execution of programs written in more general programming languages such as C. Many authoring tools also include draw programs for the construction of raster graphic pictures and wave editing programs for sound creation.

These programs are very powerful and give a skilled programmer the ability to create the sophisticated hypermedia applications described above such as Myst or Treehouse. Learning to use these tools to develop a hypermedia application generally takes many weeks or months and is therefore an activity normally carried out only by professionals or committed hobbyists. Moreover, it is generally necessary to make use of more specialized development tools to produce the graphics, sound, and animations required for a hypermedia application. Most applications created using these tools require programs written in more general programming languages such as C for the execution of hot spot actions or to maintain application data structures. The authoring tool simplifies the job of programming a multimedia hyperlinked application by giving a programmer ready made modules for multimedia such as animation and sound playback, and providing an interface that makes it easier to view, cut, and paste graphics and sound developed elsewhere, and to link the display of graphic scenes or execution of arbitrary actions to hotspots. Nevertheless, using these tools it normally takes many hours or months and programming by skilled artisans to develop a hypermedia application.

SUMMARY OF THE INVENTION

It is therefore an object of the invention to provide a graphical user interface for an operating system in which different directories are associated with different pictorial graphics so that the user is presented with a graphical indication of which directory is the currently selected directory.

It is also an object of the invention to provide a graphical user interface for an operating system in which the user can link or append new pictorial graphics to directories.

It is also an object of the invention to provide a graphical user interface for an operating system in which icons are not limited to a preset size and shape.

It is another object of the invention to provide a graphical user interface in which the contents of a directory are displayed as pictorial elements in a pictorial graphic image which identifies the directory.

It is still another object of the invention to provide a graphical user interface in which a pictorial graphic image which identifies a directory is scrollable in at least two directions.

It is yet another object of the invention to provide a graphical user interface in which the user can create new icons by selecting portions of a pictorial graphic image which identifies a directory.

It is also an object of the invention to provide a graphical user interface in which icons are animated.

It is another an object of the invention to provide a graphical user interface in which icon animations may be unique to an icon and an operating system action.

It is also an object of the invention to provide a graphical user interface for an operating system in which icon animations are generated automatically by the interface.

It is another object of the invention to provide a graphical user interface in which operating system actions are represented by an animated character.

It is still another object of the invention to provide a graphical user interface in which different operating system actions are represented by different animations.

It is yet another object of the invention to provide a graphical user interface in which different operating system actions are represented by different animations which are accompanied by sound output.

It is also an object of the invention to provide a graphical user interface in which different operating system actions are represented by different animations which are accompanied by sound output and the animations and sound are metaphorical of the operating system actions.

It is another object of the invention to provide a graphical user interface in which the user initiates operating system commands and other commands by controlling the actions of an animated character.

It is still another object of the invention to provide a graphical user interface in which the user initiates operating system commands and other commands by controlling the actions of an animated character with a button based input device such as a game pad controller device.

It is also an object of the invention to provide a graphical user interface having all of the above described features and in which the graphics, icons, sounds, animated character, and animations are definable by the user.

It is another object of the invention to provide a graphical user interface in which user input is derived from a minimal button based device such as a gamepad controller.

It is still another object of the invention to provide a graphical user interface in which user input is derived from a minimal button based device and where the mapping of keycodes is augmented with context and argument semantics so that a single button press will have a different effect at different times.

It is also an object of the invention to provide data structures, internal procedures and user level commands which effect a graphical user interface as described above.

In accord with these objects which will be discussed in detail below, the pictorial user interface of the present invention includes a pictorial image which is linked to a file directory and which identifies the file directory. Objects in the pictorial image are icons linked to file objects and an animated character is overlaid on the pictorial image. User input causes movement of the animated character relative to the pictorial image and animates objects in the pictorial image. Input from the user is preferably through a limited input device such as a gamepad controller, a mouse, or by using a limited number of keys on a normal keyboard. Input signals are mapped according to keycode identical command sets, context arguments and selection arguments.

There are preferably three classes of commands: OS Commands, Pictorial Object Commands, Interface Utility Commands. OS Commands correspond to the operating system commands of the underlying operating system and include such commands a copy_file, change_directory, display_directory, etc. Pictorial Object Commands are used to define and modify the pictorial user interface. Such commands include link_directory_image, define icon, etc. Interface Utility Commands are used to change and maintain the runtime state of various portions of the pictorial interface. Some of these commands allow the user to select and direct input or output for use with OS commands, e.g. collect_file_object, select_collected_object, etc. Other of these commands allow the user to change the settings of the interface, e.g. make_icons_invisible. Context and selection arguments typically relate to files, directories, icons, or pictures which are arguments for certain commands. Some commands may only use one argument. Other commands may use two arguments or no arguments.

Sequences of raw input signals are interpreted as "tokens" and are mapped to keycode-identical command sets. When a meaningful input signal is interpreted, the location of the animated character relative to the pictorial image is used to identify an icon and its associated file object as an argument. The combination of an argument and a key-code identical command set is mapped to a command code that uniquely defines a user-level command. The command code is used to access a basic execution unit which includes an executable command and a set of animations. The basic execution unit preferably includes a prologue animation, a command script, and an epilogue animation. The prologue animation is a way of echoing input to the user. If the prologue animation is not displayed, the user knows that the input signal was not accepted. The epilogue animation gives an indication of the results of the execution of the command script. Preferably, animation sequences which involve icons include a sequence for the animated character and another sequence for the icon which is underlaid with the character animation sequence to generate the animation to be played. According to a preferred embodiment of the invention, audio clips are linked to animation sequences. The animation sequences and the audio clips are preferably metaphorical of the command executed in the command script.

According to a preferred embodiment of the invention, icon animation sequences are created at runtime after the icons have been defined by the user. However, predefined icons may have predefined animation sequences. Character animation sequences are preferably predefined. While animation playback is generally tied to command execution, a calibration animation is used to move the animated character from the location and orientation it is in when a basic execution unit has finished execution to a location and orientation that is consistent with the starting frame of the prologue animation of the subsequent basic execution unit.

The presently preferred embodiment of the invention uses a top level function to control interaction with the user, the playback of animation sequences and the execution of commands. The control structure of the top level function takes a parse graph of valid command sequences, a command buffer, and an input command map as arguments and returns an argument which includes the results of command execution. The results of command execution are mapped to epilogue animations. This structure allows for nested commands and nested animation sequences and also provides one way to limit which commands a user may invoke during recursive iterations of a command execution. In addition, the semantics of input keys can be remapped during nested interaction with the user so that fewer input keys are needed. In this case, one input key can have several functions depending on the context in which it is pressed.

The pictorial user interface of the invention can be used as an overlay with virtually any operating system such as Unix or OS/2. It is preferable that the OS support preemptive multi-tasking, but non-preemptive multitasking is sufficient. The invention supports alternative animations, pictures, and input signal mappings either at installation or during startup. For example, a user may select a character personality and accompanying animations at runtime. The user may also specify what kind of input device is preferred.

The pictorial interface of the invention is useful with virtually any file system but has particular utility with hierarchical file systems which need to be accessed in non-hierarchical ways. While the invention provides many features which allow for its easy definition and configuration by the user, definition and configuration is not necessary for each user. For example, a teacher or a parent may define and configure a particular pictorial environment for use by a child where the pictures and objects have particular relevance to the child. A vendor or advertiser may define and configure a particular pictorial environment for use by a client where the pictures and objects represent the vendor's goods or services. Other possible uses for the pictorial interface include: a virtual library, catalog, atlas, shopping center, mail system, etc. The interface allows a novice user to deal directly with a file system to access information in a pictorially intuitive way. Additional objects and advantages of the invention will become apparent to those skilled in the art upon reference to the detailed description taken in conjunction with the provided figures.

DETAILED DESCRIPTION OF THE PREFERRED EMBODIMENTS

The Pictorial Display

Figure 1:
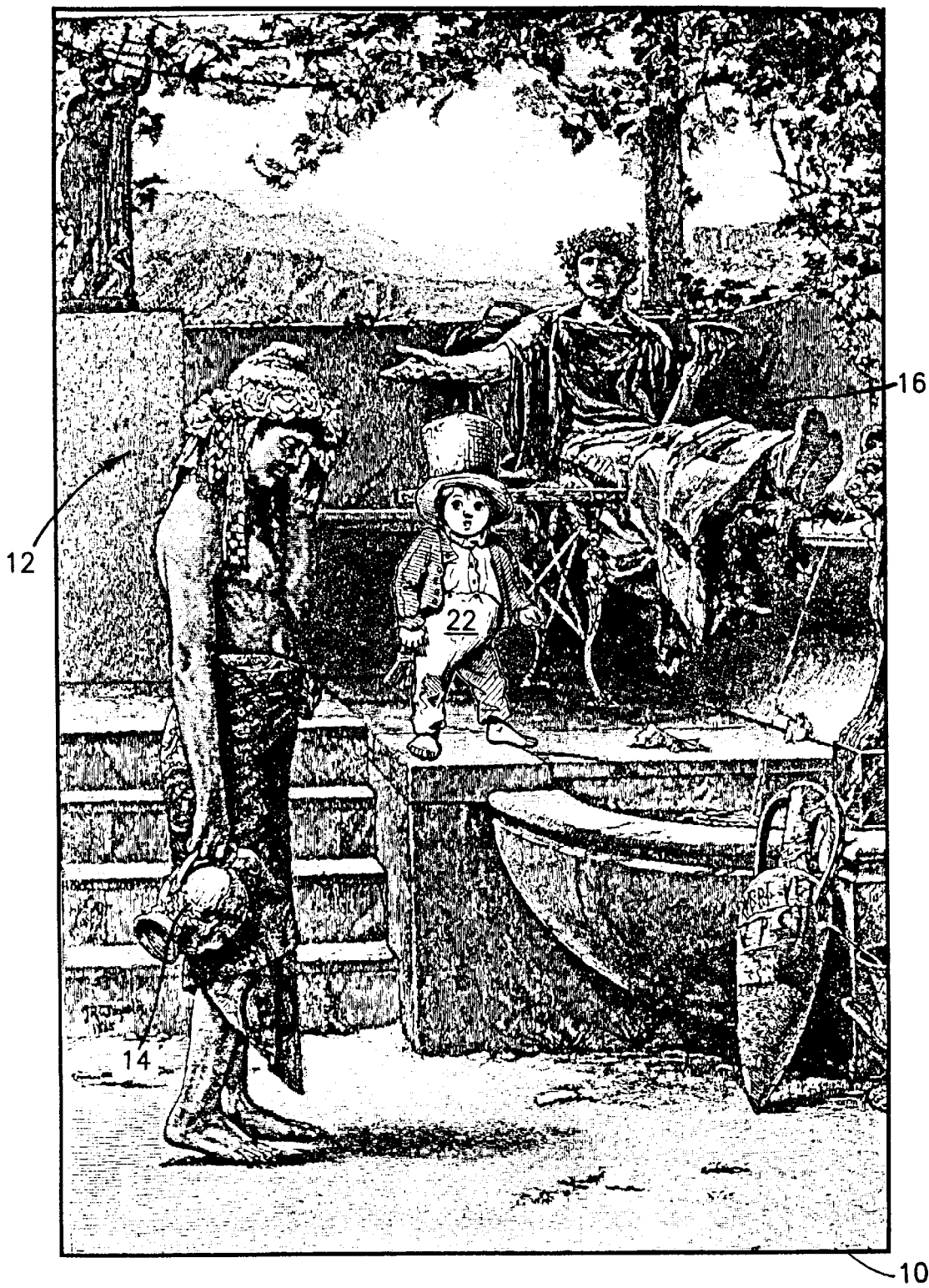
FIG. 1 is an example of screen view of a pictorial user interface according to the invention showing a portion of a scrollable pictorial image and an animated character.
Figure 1A:
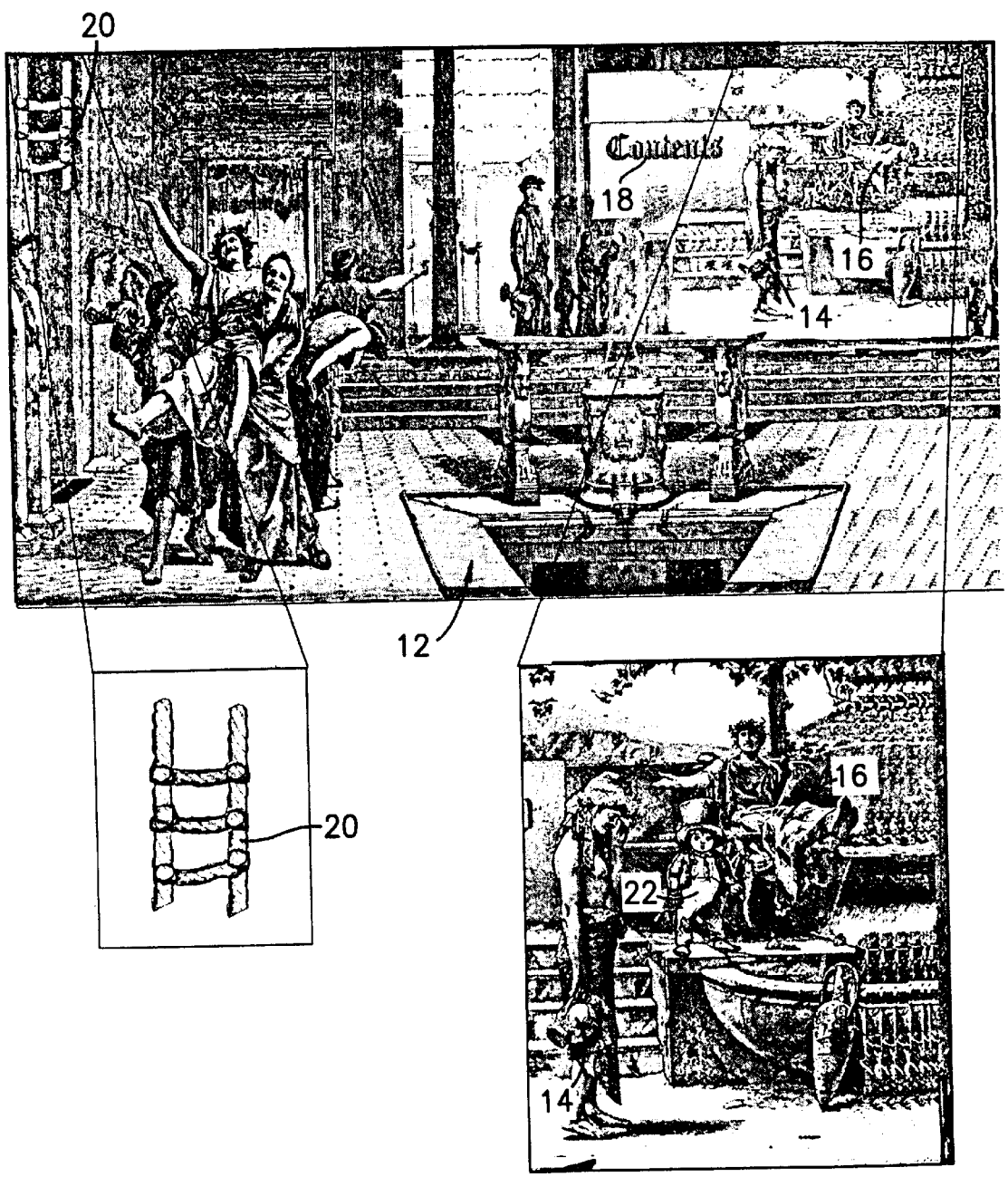
FIG. 1a is a view of the entire pictorial image of FIG. 1 with two portions of the image broken out.

Turning now to FIGS. 1 and 1a, the pictorial user interface according to the invention provides a screen display 10 of a pictorial background image 12 (FIG. 1a) which represents a directory in a computer file system. For example, the picture displayed in FIG. 1 is of a roman nobleman and slave which represents a directory whose contents contains a draft of a book on Ancient Roman History. According to the invention, the pictorial information in the background image 12 is preferably metaphorical of the subject matter content of the directory. Moreover, individual sub-images 14, 16, and 18 (FIG. 1a.) (hereinafter referred to as "icons" for simplicity) in the background image 12 relate to individual files or subdirectories contained in the directory represented by the background image 12. Each of these icons is also preferably metaphorical of the subject matter content of the file or subdirectory to which it relates. For example, the water urn icon 14 relates to a file about Ancient Roman ceramics and the nobleman icon 16 relates to a subdirectory containing information about the politics and government in the Roman Empire. At least one icon in the screen display relates to an ancestor directory unless the background currently displayed is the super root directory. For example, in FIG. 1*a*. the ladder icon 20 relates to the parent directory of the current directory. As seen in FIG. 1, the icons need not be rectangular and they may vary considerably in size. Although the invention attempts to obviate the need for textual information in the screen display, text may be included, at a user's option, within icons to further define their meaning. For example, in FIG. 1*a*. the stucco wall icon 18 includes the text string "Contents" to identify it as a file containing a Table of Contents to the book which is contained in the directory represented by the background image 12.

An animated character 22 is overlaid on the background image 12 and is made responsive to an input device (shown and described with reference to FIGS. 2 and 2*a*) so that a user can control the movements and actions of the animated character 22. According to the invention, the animated character 22 may be moved to different positions on the screen display 10 to interact with any of the icons in the background image 12. The animated character roughly corresponds to the cursor or pointer in a WIMP GUI. While a cursor normally has a single "hot spot", the animated character of the invention is preferably provided with several potential hot spots. Which of the potential hot spots is the current hot spot depends on the command code invoked by the user. The cursor as used herein is defined as a hot spot location in a coordinate system meaningful to the user, e.g. the display screen. The cursor preferably includes a rectangular region and a coordinate that places the region in a coordinate system meaningful to the user. The cursor can either lead or follow an animation. It can appear visually as a part of the animation or it can appear as a standard cursor. According to the presently preferred embodiment, the cursor appears as a component of the animated character (e.g. the foot of the animated character) such that the user controls the animation directly while the cursor hot spot is periodically updated under program control to align it with the animation.

The cursor hot spot is preferably tracked with respect to the background image coordinate system and/or an animation coordinate system. The function of the cursor is primarily to select icons or regions from the background image or from animation frames that have been overlaid on the background image. When the cursor hot spot is a component of an animation, the cursor hot spot may shift from one component of the animation to another. For example, the hot spot may be the character's foot for one command and the character's left hand for another. When the cursor hot spot is a component of the animation, the cursor location is preferably updated each time an animation has been played.

If the background image 12 is too large for the display screen 10, the image 12 is scrollable so that if the character 22 is moved far to the left, right, top, or bottom of the display screen 10, the background image 12 scrolls. Scrolling is preferably toroidal. According to the invention, when the character 22 is moved from one screen location to another, it exhibits an animation such as walking. When the animated character 22 interacts with an icon, both the character 22 and the icon exhibit an animation. The animation exhibited is preferably metaphorical of some operating system action.

As will be described in detail below, the background images and sub-images are selectable and definable by the user to relate to user specified files and directories. In addition, the animated character and its animations are selectable and at least partially definable by the user to relate to specific operating system actions.

The Input Device

Figure 2A:
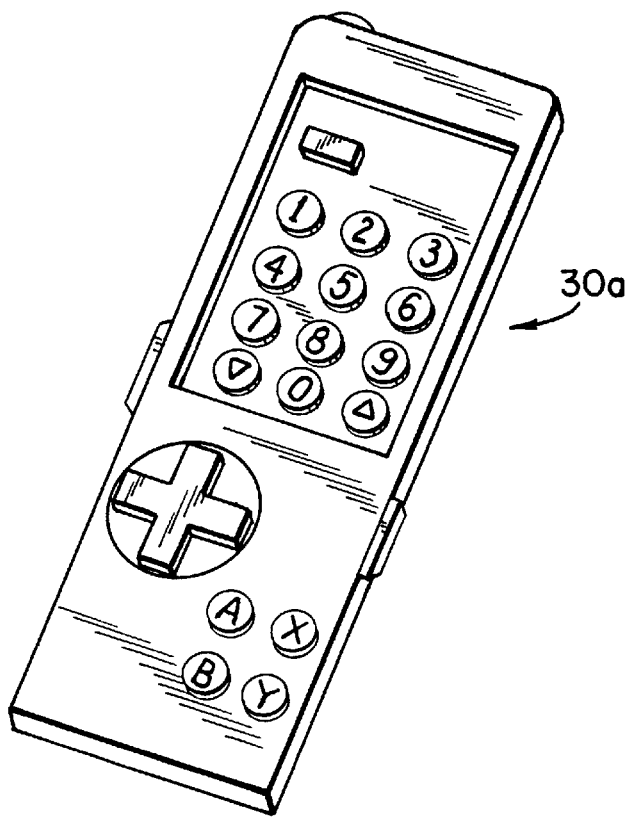
FIG. 2a is a perspective view of a wireless button based input device.
Figure 2:
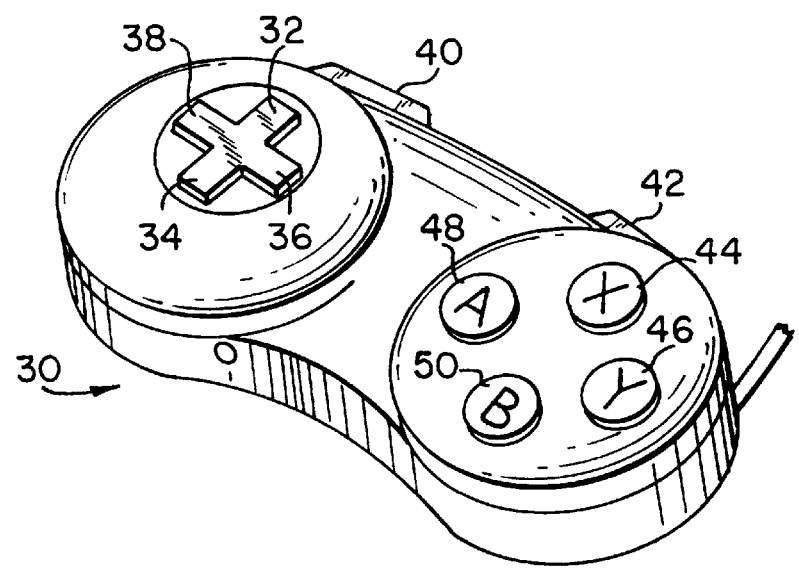
FIG. 2 is a perspective view of a suitable game pad controller for use with the interface according to the invention.

FIG. 2 shows a known game pad controller 30 which is suitable for use as an input device with the pictorial interface according to the invention. The controller 30 is a limited input device having ten buttons. Four of the buttons are arranged as a direction pad having a north button 32, a south button 34, an east button 36 and a west button 38. Two, buttons located on the front edge of the controller are designated the left button 40 and the right button 42. The other four buttons are labelled the X button 44, the Y button 46, the A button 48, and the B button 50. While the controller 30 is typically hard wired to the input port of a computer, it will be appreciated that a wireless infrared controller 30*a*, such as shown in FIG. 2*a*, could be used. It will also be appreciated that such a limited input device is not necessarily limited to ten input keycodes. Two or more buttons may be pressed in combination to effect many more than ten input keycodes. As a practical matter, it is undesirable to require that any more than three buttons be pressed in combination. According to the present invention, the button positions are mapped with context and selection arguments so that the same button combinations can have different results in different situations. Appendix A on Micrifiche lists how the presently preferred user-level commands are mapped to the buttons of the game pad controller shown in FIG. 2. The button assignment is specified to comply approximately with the following logic:

| | |
|---|---|
| LEFT Button | commands for creation |
| RIGHT Button | commands for deletion |
| B Button | commands for "teletransport" to other "worlds" |
| A Button | commands pertaining to icons |
| X Button | commands pertaining to linking or moving objects |
| Y Button | commands pertaining to file objects |
| NORTH,SOUTH,EAST WEST | character motion |
| SOUTH (as modifier) | commands pertaining to collected objects |

The Basic Processes

The basic processes of the interface according to the invention are conveniently grouped according to three functional tasks: input interpretation, basic unit execution, and system control. Input interpretation includes parsing, mapping, and cursor control. The basic execution unit includes a prologue animation, a command execution, and an epilogue animation. System control controls execution of the basic execution units and input interpretation.

Input Interpretation

In low level parsing, signals (e.g. keystrokes) from the input device are parsed to identify meaningful sequences (e.g. A-button pressed, B-button pressed, A-Button released, B-Button released). A meaningful sequence of input signals will define a single keycode-identical command set. There are four basic mappings that are used for the interpretation of input. First, input signals are mapped to keycode-identical command sets as described above. Second, when a meaningful input sequence is received, the location of the cursor with respect to the active background image is used to identify an icon and its associated file object. Third, the combination of icon and command class is mapped to a command code that uniquely identifies a user-level command. Finally, the command code is used to access a basic execution unit that consists of an executable command and a set of animations. As mentioned above, some command classes do not take arguments. When the input sequence is determined to refer to one of these command classes, the identification of an icon (or argument) is not necessary.

In cursor control, the component of the animation that the cursor hot spot follows will generally have changed location when an animation has played. For example, if the hot spot is represented by the character's hand and the character has moved forward, the location of the hand will have changed. In addition, the cursor hot spot may have jumped to another component of the character. For example, when a certain command is invoked the cursor hot spot may jump to the character's head.

In the presently preferred embodiment, tracking of the cursor is accomplished by storing information about the cursor location with each character animation. As long as user input is not allowed to preempt animation playback, information about cursor location in the final frame of the animation is sufficient for cursor tracking. (If the user is allowed to preempt animation playback, curser information should be stored with each frame of the character animations.) For example, the suggested animation for the change_directory command is for the character to jump onto an icon that references a directory file object. In this case, the cursor can be defined to be the rectangle that bounds the character's feet at the end of the jump, or as the character lands. When animation playback is terminated, the cursor location stored with the final frame of the animation is used to update the system global cursor, i.e. the cursor variable with global scope that is maintained in the top level function. To update the system global cursor the coordinates of the cursor in the final frame of the animation that just played must be translated to the coordinate system of the video viewport using the location of the final frame of the animation in the video viewport coordinate system.

In a WIMP GUI it is important that the cursor does not jump around the screen and that observable cursor motion is continuous. This is not the case in the pictorial user interface of the invention. Here the animated character is the entity that should demonstrate consistency in observable motion and location because the character is the focus of the user's attention. In fact, an advantage of the pictorial interface of the invention is that the cursor location can jump around to various parts of the animated character depending on what makes sense for the interaction of character and icon animations. Since the cursor location stored with each animation is set relative to the animation frame origin, registration of the cursor across animations is accomplished when animations are registered with one another via the character's center of gravity. The character's center of gravity is a point selected by the animation designer to be the relevant registration point. Preferably, the center of gravity os a registration point that makes sense anatomically, e.g. the center of the pelvis for a human character.

The Basic Execution Unit

The basic execution unit includes a prologue animation, a command script invoked by the user or through system control, and an epilogue animation which may be conditional upon the results of command execution. Basic execution units are the core processes of the pictorial user interface. Each command that can be invoked by a user is represented by data structures for basic units, e.g. a prologue animation, epilogue animations, and a command script. Basic execution units can be sequenced in any way or restrictions on allowable sequences of basic execution units can be defined. In the preferred embodiment, restrictions on allowable sequences of basic units are defined and enforced by designating a parse graph as one of the inputs to the top_level function which is described in detail below.

There are three classes of commands associated with basic execution units. One class of command is roughly equivalent to the commands available in the operating system. The exact commands of this class vary according to the operating system being used. A second class of command is used to create and maintain the pictorial representation of file objects. These are the commands that allow a user to define icons and link file objects to icons, and to perform other tasks in defining their instantiation of the pictorial interface data structures. Finally, there are utility commands that are used to change and maintain the state of various runtime data structures defined by the invention, such as the list that records objects collected by the animated character. In order for a character to collect objects and carry them along, utility commands are used to add objects to the collection, view collected objects, and discard objects from a collection.

Normally, arguments to commands are file objects or icons. In the preferred embodiment, a user can manipulate the animation to identify up to two arguments for a given command. These arguments have been labeled the context argument and the selection argument. Some commands will use only a context argument or a selection argument, some will use both a selection and a context argument, and others will not require an argument.

The context argument is defined as the file object associated with the icon within the scope of the cursor hot spot at the time the command is issued or after the last frame of the prologue animation has been played. The selection argument is identified by the user by issuing a set_selection_arg command prior to use of the argument by another command. In the preferred embodiment, the animation for set_selection_arg depicts the character picking up an icon. After a set_selection_arg command has been issued, the image of the icon selected will be merged with subsequent animations of the character so that the character appears to hold the icon until a reset_selection_arg command is issued.

Each prologue and epilogue animation is preferably made up of two separate animation sequences, one for the character's behavior and one for the icon's behavior in those commands which take arguments. In the presently preferred embodiment, frame animation is used. Using frame animation, the character and icon animation frames are merged by cel overlay prior to playback. Depending on the command being executed, other modifications to the stored animation frames may be required prior to playback. For example, in the preferred embodiment, if the selection argument has been set, the image of the selection argument is overlaid on each frame of the character animation to indicate which icon(s) has been selected.

The prologue animation is a way of echoing input to the user. For example, if the user presses the B-Button the character jumps into an icon. If the character fails to jump, the user will know that the input signal failed in some way. Similarly, the epilogue animation can be used to communicate the results of command execution to the user by associating a unique animation with each of the execution results that may be returned by the command.

Audio clips are optionally stored with each animation. They may provide sound effects or musical accompaniment to the animation action. In addition, audio segments may be associated with directories in the same way that images are associated with directories. The sound effects and/or musical accompaniment are preferably chosen to be metaphorical of the command associated with the animation or the content of the directory. In the preferred embodiment of the invention, audio segments associated with a directory override audio segments associated with character motion animations, but are preempted by audio segments which are associated with other character animations.

Figure 3:
FIGS. 3 and 3a through 3c are views similar to FIG. 1 showing how an object icon is defined by a user moving the animated character.
Figure 6:
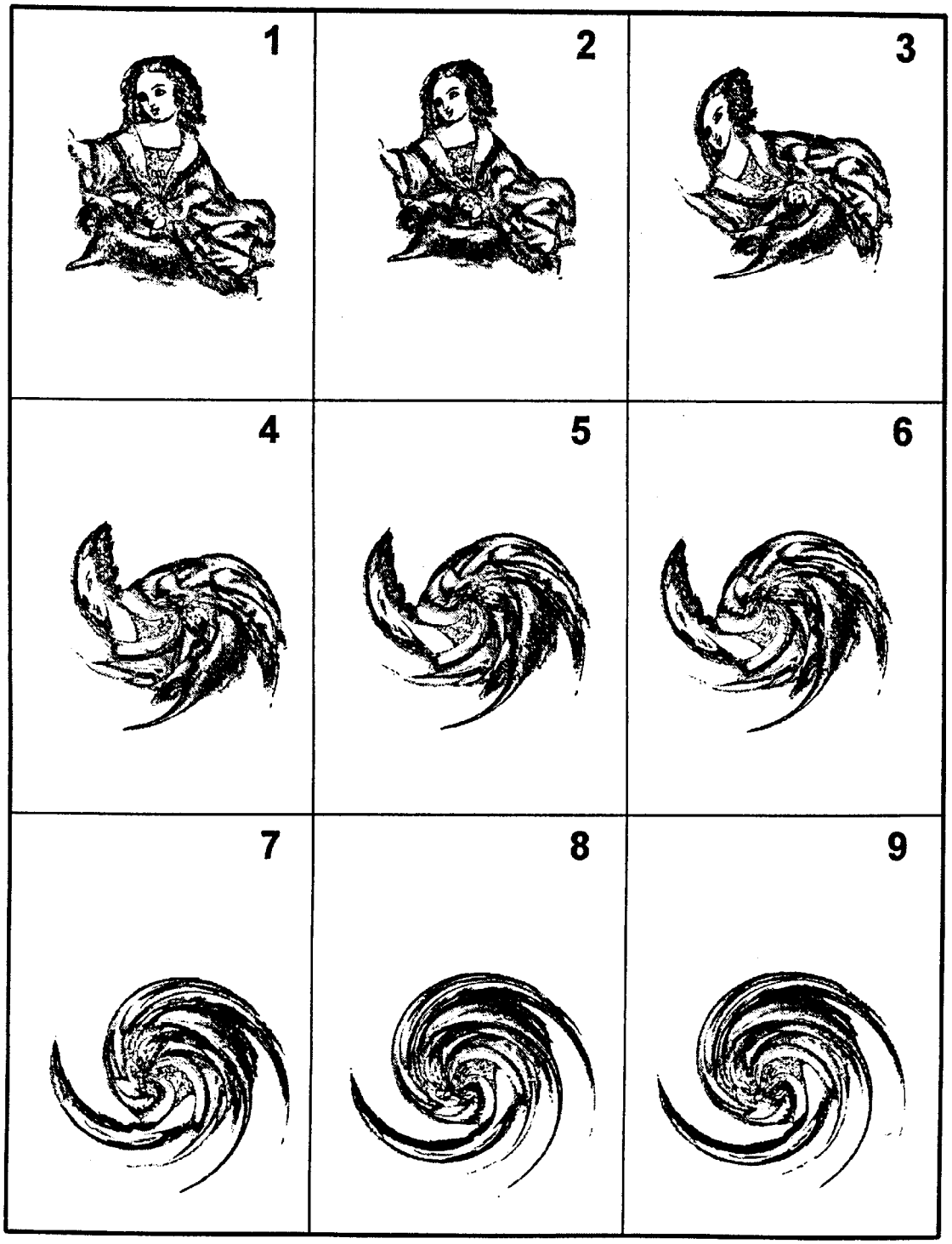
FIG. 6 shows an exemplary sequence of an icon animation.

Animations for icons are preferably not created until the icons have been defined by the user. This means icon animations will be generated at runtime. Depending on performance and storage capacity, icon animations can be generated at the time icons are defined or at the time the animations are invoked. Animation frames for icon animations are generated by image transformations using techniques for image distortion (e.g. warps, morphing, etc.) or particle systems. An icon animation generation function takes the icon image (after the mask is applied to the icon region) as input. It returns an animation sequence that shows the transformation of the base image. There are many well known functions for image warping and distortion that can be used to generate animations. Warping functions remap image pixels along specified trajectories in space and may include transformations in color or intensity as the pixels proceed along the trajectories. For most warping functions, pixel trajectories for an arbitrary image are computed automatically. In the case of morphing, trajectories are computed with reference to user specified pairs of points or lines. An animation is generated from a warp function by rendering each frame of the animation by computing the new location of each pixel in the image at discrete times as they proceed along the trajectory. FIG. 6. shows succesive frames of an icon animation generated by applying a well known distortion function to the icon image of the girl defined in FIGS. 3–3c.

Particle systems are an alternative method of specifying the evolution over time of different components of an image. Hand placed transpositions of particles have been frequently used to generate animations of explosions or fire. In a particle system, the evolving location, color, and/or intensity of each particle (set of pixels) can be generated automatically using probabilistic rules. The selection of particles from an image region can also be done according to probabilistic rules. A number of well-known techniques such as particle systems or morphing can be used to write animation generating functions. In the presently preferred embodiment, it is assumed that an animation generating function accepts two arguments: the base bit map and a string variable that is parsed to obtain additional parameters, if needed. It is also assumed that each user-level command may use a different animation generating function for its icon animation. In the presently preferred embodiment, it is assumed that an animation generating function accepts two arguments: the base bitmap and a string variable that is parsed to obtain additional runtime parameters, if needed. It is also assumed that each user-level command may use a different animation generating function for it's icon animation.

Figure 4:
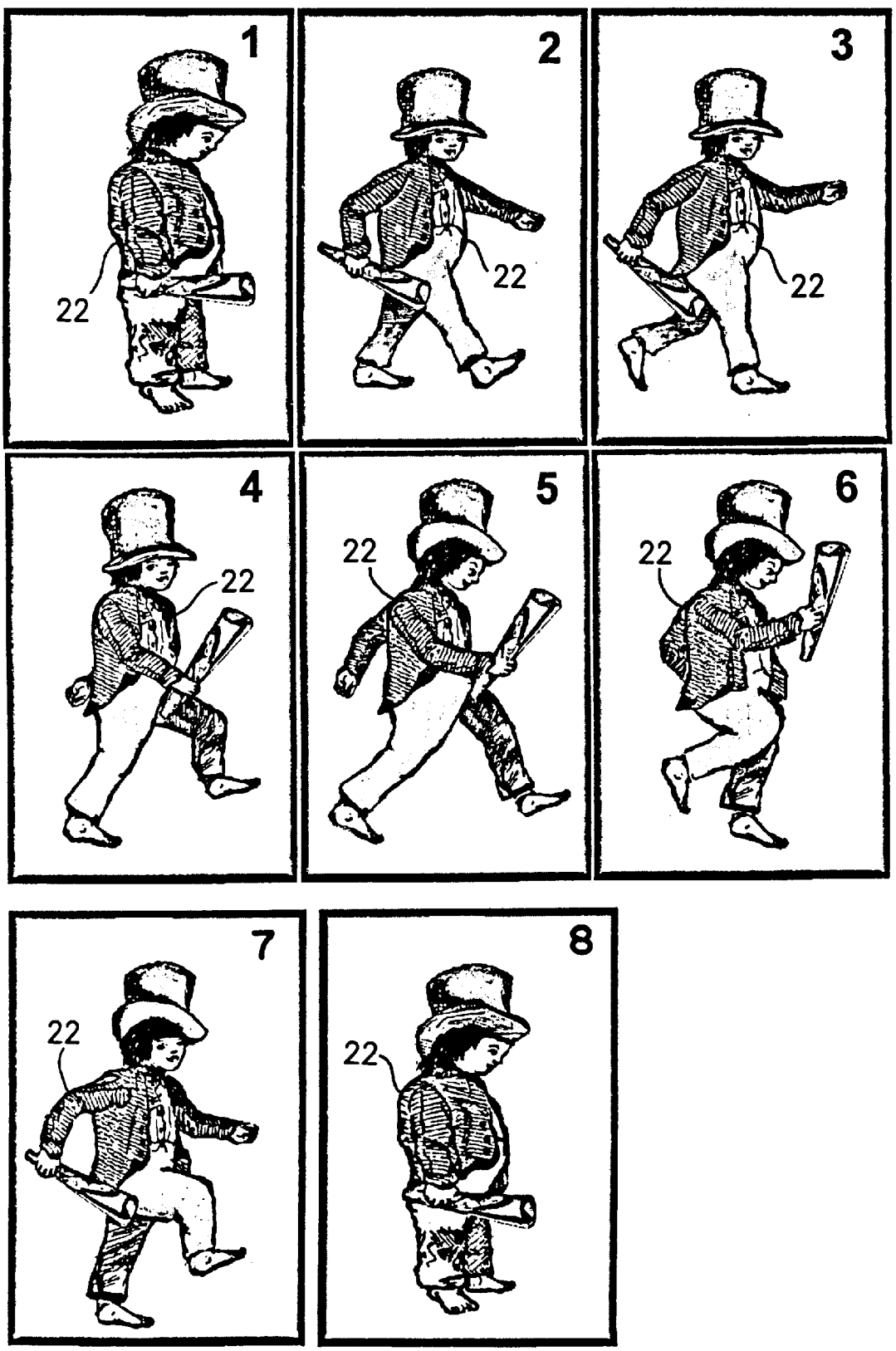
FIG. 4 shows an exemplary sequence of character prologue animation for the command display_directory_right.
Figure 4A:
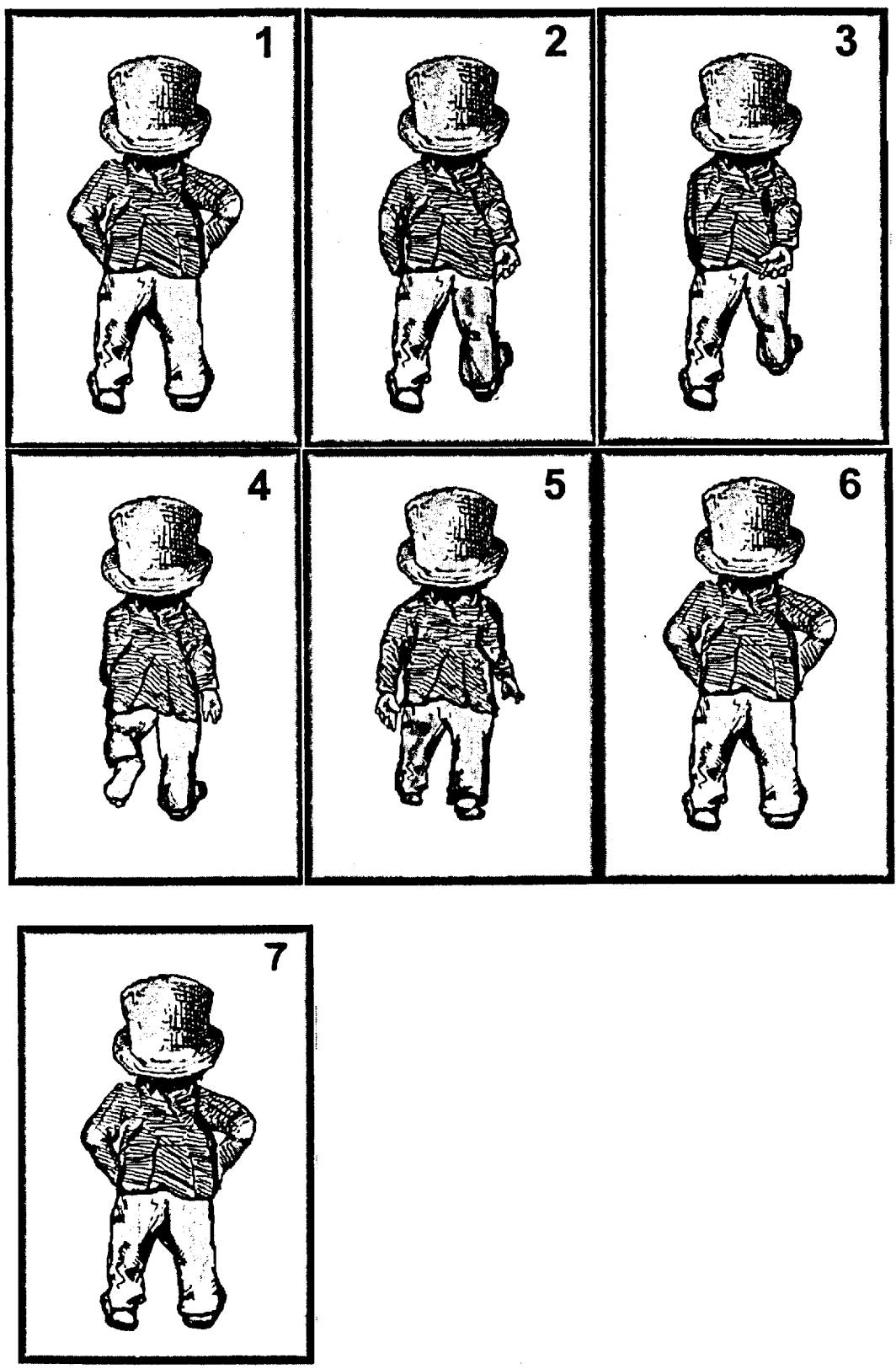
FIG. 4a shows an exemplary sequence of character prologue animation and epilogue animation for the command display_directory_up.
Figure 4B:
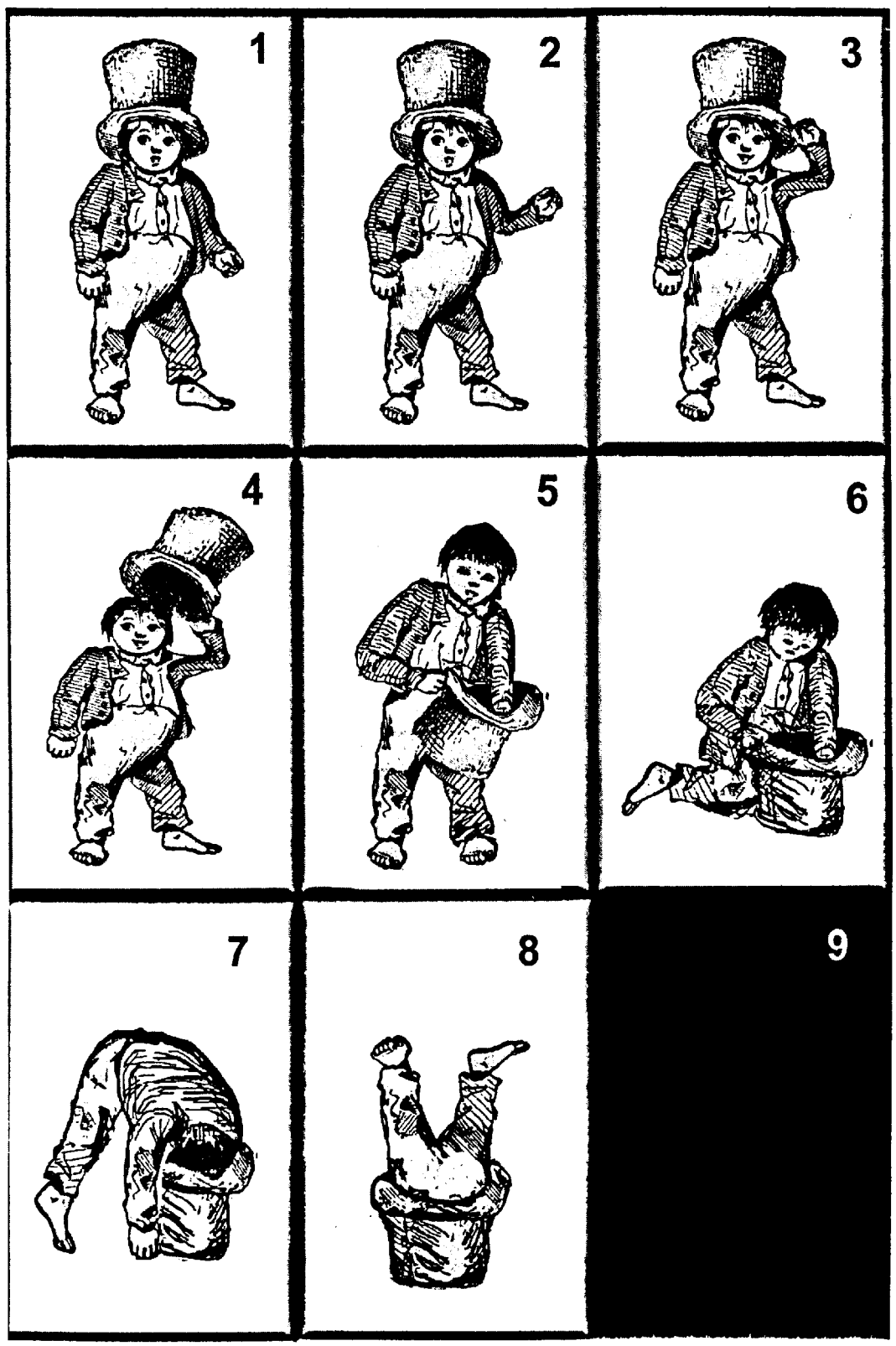
FIG. 4b shows an exemplary sequence of character prologue animation for the command collect_selection_arg.
Figure 4C:
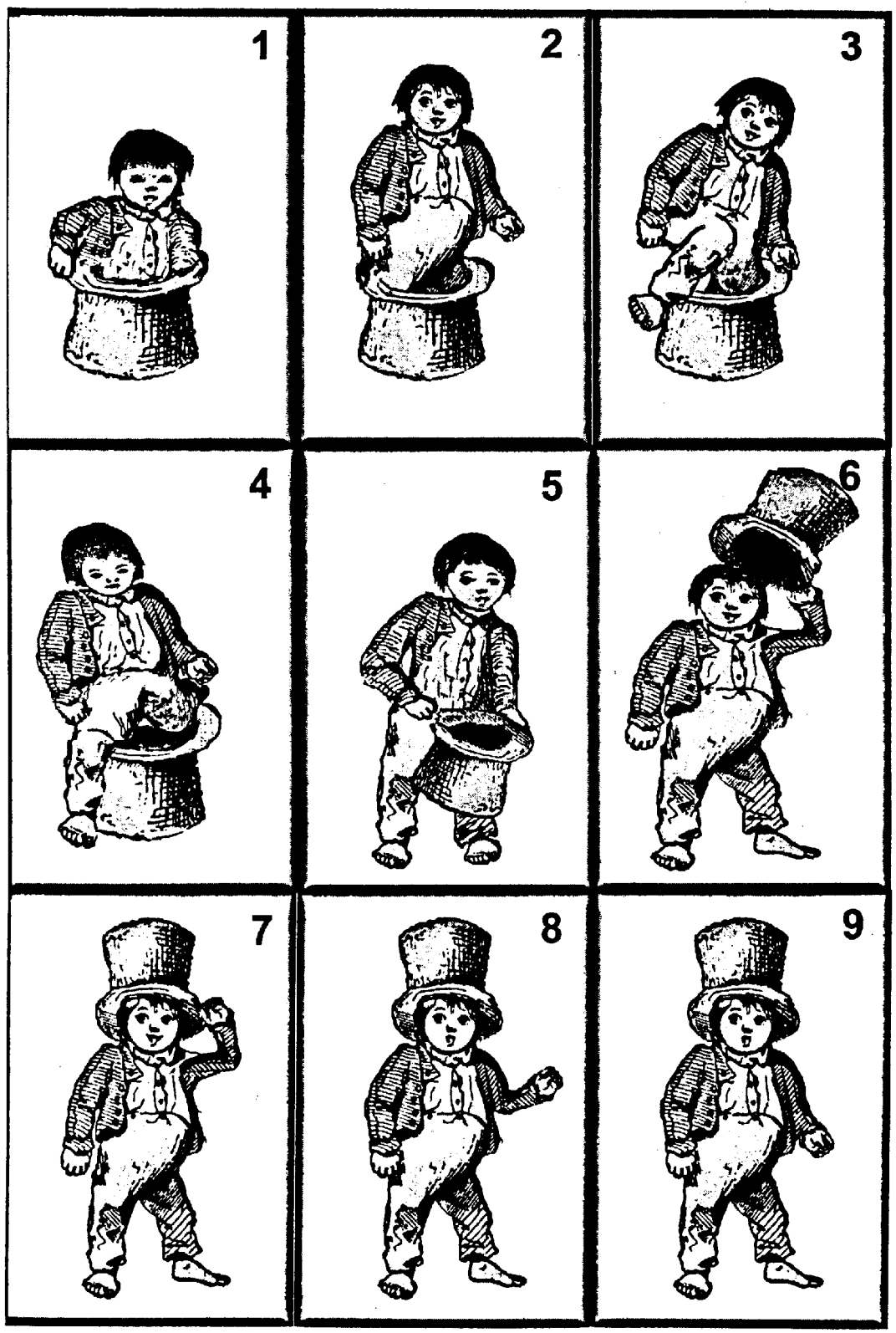
FIG. 4c shows an exemplary sequence of character epilogue animation for the command collect_selection_arg.

Icon animations are merged at runtime with character animations by the method of cel overlay. In addition, many animations are modified before they are played in order to depict special conditions of the interface state. For example, when the selection argument has been set, the character will appear to hold the selected icon in one hand. Modifications such as these can be accomplished using cel overlays on animation frames that have been annotated to identify appropriate regions, e.g., the hand. Information needed for the modification of animations by cel overlays can be stored with the header information for each animation. For example, the center of a selection argument will be registered with a point stored for each frame in an animation. Other information is optional. For example a bit mask can be stored with the animation and used to mask out portions of the selected icon so that it can be better integrated with the animation images, as when the character holds a rolled up poster in his hand and the hand appears to obscure part of the poster as seen in FIG. 4, for example.

Generally a stored animation sequence will need to be transitioned or "calibrated" to the current character and icon positions before being played. "Calibration" is used to ensure that the following constraints are satisfied:

(1) The current character position matches the character's position in the starting frame of the animation to be played. The match need not be exact but it must be within a well defined threshold.

(2) The current character location, direction and distance of motion in the animation will propel the character to the correct location for interaction with the icon.

Calibration can be accomplished by using known methods of inverse kinematics or dynamics or by using a technique that combines archetypal positions and location prediction. Using inverse kinematics, motion trajectories can be computed in reverse. That is, given a location and position for the character to be in at some point in the future, e.g. the position of the starting frame of the prologue animation to be played, the motion required to place the character at that position and location can be computed. The data structures that define the character model must be sufficiently detailed to support the calibration technique selected. For example, the use of kinematics to generate character animations at run-time would require that the character model minimally include joint locations and constraints on velocities for motion. Moreover, even with very simple, highly constrained kinematic models, rendering of the animation frames could be very computation intensive.

In the presently preferred embodiment of the invention, calibration of character movement to achieve smooth motion uses a simple model that includes a single registration point, such as the center of gravity defined earlier, and, for commands which accept a context argument, the location of the cursor in the final frame of the prologue animation. Location calibration is accomplished by determining cursor position by computing it at the final frame of all prologue character animations that are eligible to be played given the current input from the user. If more than one prologue animation is eligible, i.e. the keycode-identical command set has more than one member, the cursor location of the first prologue animation with an associated command that is consistent with the icon type determined by the predicted position of the cursor is used. This is a method that exploits a user's ability to estimate trajectories and predict the location of the cursor in controlling the animated character. It is assumed that a user will easily compensate for the predicted motion in controlling the animated character since this a constantly used natural action. For example, in reaching for a glass, a person first computes the inverse dynamics to determine how to control the arm and hand motion to land at the precise location of the glass.

Figure 5:
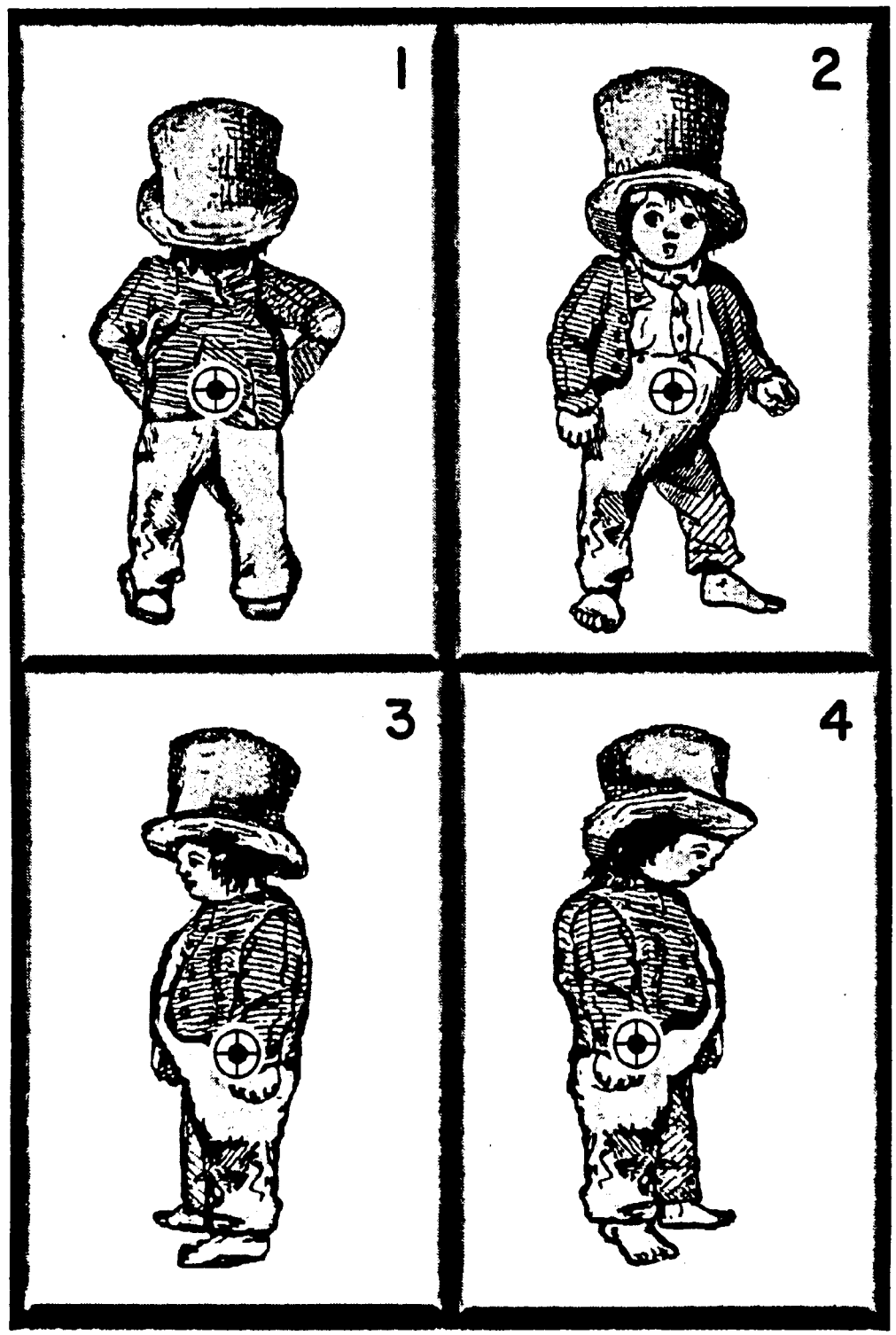
FIGS. 5 and 5a show exemplary sequences of character calibration transition animation with the registration point.

In the presently preferred embodiment, position calibration is accomplished using a set of archetypal positions and transition animations that are defined to moved the character from one archetypal position to another. FIG. 5 shows a set of archetypal positions. With the exception of a few special cases described below, all prologue animation sequence should begin and all epilogue animation sequences should end with a frame from the set of archetypal positions.

Figure 5A:
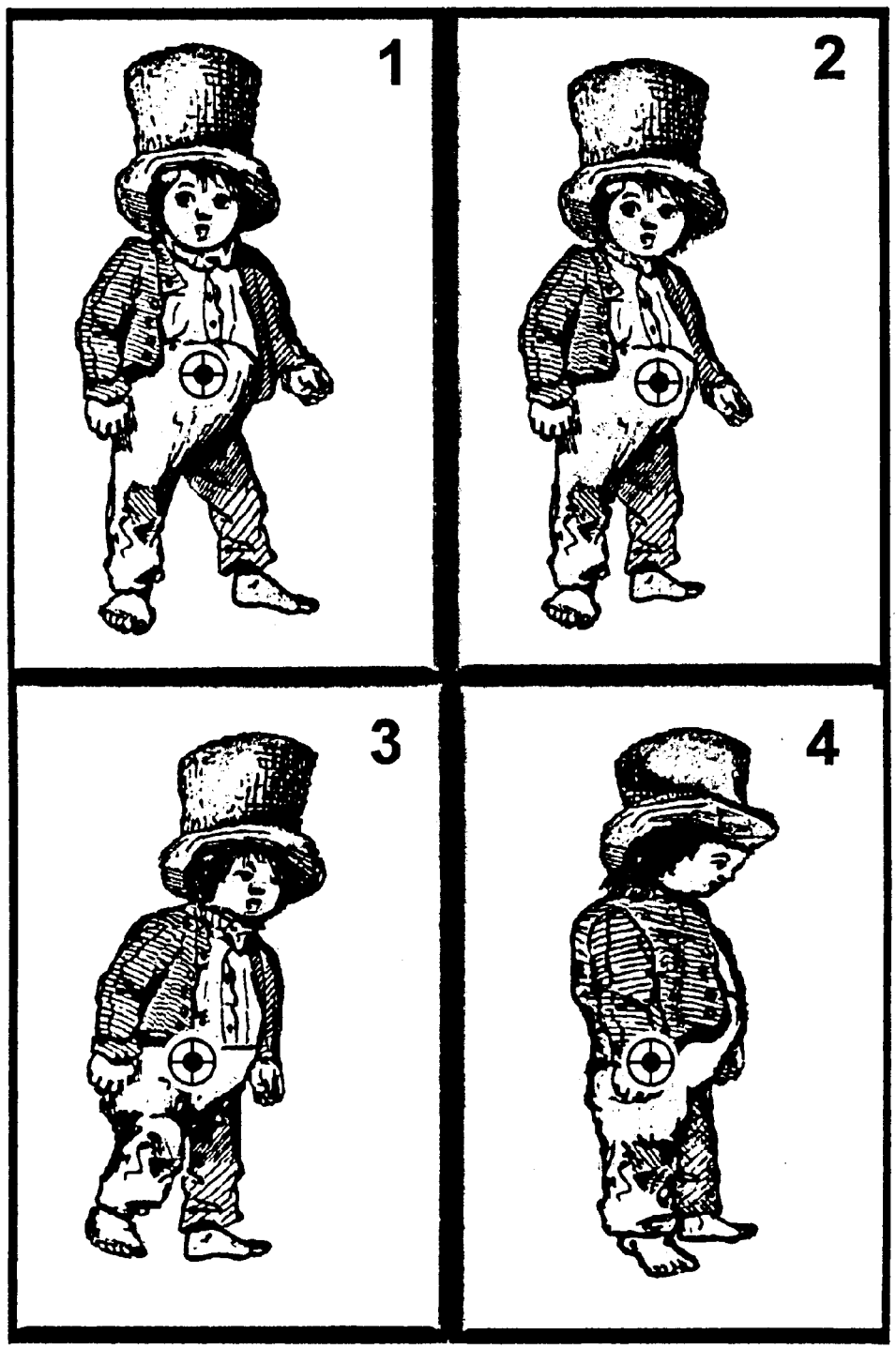

A transition animation sequence is provided for each pair of positions in the set of archetypal positions. FIG. 5a illustrates a transition animation that moves the character from the position in frame 2 of FIG. 5 to the position in frame 4 of FIG. 5. By appending the correct transistion animation sequence to the front of each prologue animation to be played, the character will appear to move smoothly from its current position, through the transistion animation, and into the prologue animation. A registration point is defined for each architypal position frame so that frames in transition animations can be appended at the correct location on the background image. In some cases, particularly for commands that are guaranteed to begin or end a recursive call to the toplevel function, the animation designer will wish to show a cut from one scene to a different scene. In such a case, the animation need not begin or end with a frame from the set of archetypal positions.

System Control

According to the invention, a "toplevel" function controls interaction with the user, the playback of animation, and command execution. The toplevel takes a parse_graph (e.g. a declarative representation of a finite state machine) that defines valid command sequences as an argument. A basic execution unit is executed only if it the command associated with it is defined as a next state in the parse graph. (Parse graphs are discussed below in the section entitled "User-Level Commands"). The toplevel also takes keycode_grammar as an argument. This allows key sequences to have different semantics within the scope of a recursive call. It also allows a command to mask user input prior to making a recursive call to toplevel. This is a second method (in addition to the parse_graph) by which the set of commands that the user may invoke can be restricted within recursive calls to toplevel. Commands are allowed to make recursive calls to toplevel in order to provide for nesting of basic execution units. When called, the toplevel returns an argument, e.g. a pointer to a character string.

According to the presently preferred embodiment, the toplevel also takes a command_buffer as an argument. By inserting commands into the command_buffer, commands can invoke other commands under program control. This does not add functionality (commands could insert input signals into the input buffer in the simplest control structure) but it does simplify the implementation.

The results of command execution are mapped to epilogue animations and the map is used to select which epilogue animation to play. A procedure is invoked to calibrate the animation sequence just completed to the one about to execute in order to ensure smooth motion during the transitions. The calibration animation procedure is described below in the section entitled "Internal Procedures". In general, however, it is an executable function that accepts a starting position and an ending position as an argument and returns an animation sequence that moves the character from the starting position to the ending position. The control structure for the presently preferred embodiment of toplevel is:

```
toplevel (parse_graph, keycode_grammer, command_buffer)
    do until current_state is a terminate command or a leaf in
    parse_graph
        if command_buffer is empty
            get user_input from input_buffer
            map user_input to keycode-identical_command_set
            map context argument and basic unit
                from cursor location, background_image,
                    and prologue_animations associated with
                    keycode-identical_command_set
        else get basic unit and arguments from command_buffer
        if command follows current_state in parse_graph
            get calibration animation
            play calibration animation
            do /*execute basic unit*/
                play prologue animation
                execute command
                map results of command execution to find epilogue
                animation
                play epilogue animation
            end do
            update current_state in parse_graph
        end if
    end do
    return result
end toplevel
```

This control structure makes it possible to nest animation sequences. With nesting, error handling and command specific dialogues with the user, toplevel can utilize the structure of a basic execution unit in a disciplined manner. During user interaction subtasks, "child" animation sequences can be invoked using this control structure. This has the benefit of preserving a single structure of interaction with the user, a uniform set of data structures, and it simplifies code development. Subtasks such as error handling routines or requests for confirmation can implement prologue and epilogue animation sequences with the same type of data structures, e.g. input_animation_map, as are used for commands that are directly invoked by a user.

For example, the quit command, according to the presently preferred embodiment, illustrates the use of nested basic execution units. The prologue animation depicts the character looking disappointed and asking, "Are you sure?". A nested animation sequence reveals two signs on the background, one saying "quit" and the other "quit" with a crossbar drawn through the word. The user moves the character to the desired sign and pushes the B button. The epilogue animation of the nested sequence shows the signs explode and the nested sequence returns to the toplevel sequence. The epilogue animation of the toplevel sequence shows the character wave goodbye or, alternatively, wipe his brow in relief. The result is a sequence of animations in which the character looks towards the user and asks, "Are you sure?", responds to input from the user by selecting a sign, and finally, depending upon the input from the user, either waves goodbye or wipes his brow in relief.

The input_buffer will normally be flushed prior to a recursive call to toplevel. Recursion should be carefully controlled to avoid transitive chains in command calling sequences in which a sequence of commands can loop indefinitely. This can be done by defining parse graphs to restrict command execution within any recursive call to toplevel. Restrictions on allowable sequences of basic units can be used to prevent transitive chains. In addition, parse graphs can be defined to require particular interaction scenarios with the user. In the presently preferred embodiment an empty parse graph is equivalent to a completely connected parse graph, i.e. there are no restrictions on command sequences. This simplifies the implementation so it is not necessary to define every state and transition in the parse graph unless it is to be restricted.

The semantics of input keys can also be redefined for the duration of a nested interaction with the user because toplevel accepts the input_command_map and the parse_graph as inputs. This feature allows a designer to reduce the number of input buttons which must be manipulated and learned by the user. For example, in the preferred embodiment, the B-Button is normally used for default activation of an icon but within the dialog nested in the define_icon command, the B-button is used to define the corners of a rectangle.

Recursive calls to toplevel normally conform to the following script:

1. flush input buffer;
2. insert commands into command_buffer, if necessary;
3. call toplevel with an appropriate input_command_map and parse_graph as input.

Execution is terminated when a terminate command is invoked or if a terminal state in the parse graph is reached.

Figure 3A:
Figure 3B:
Figure 3C:
Figure 3D:
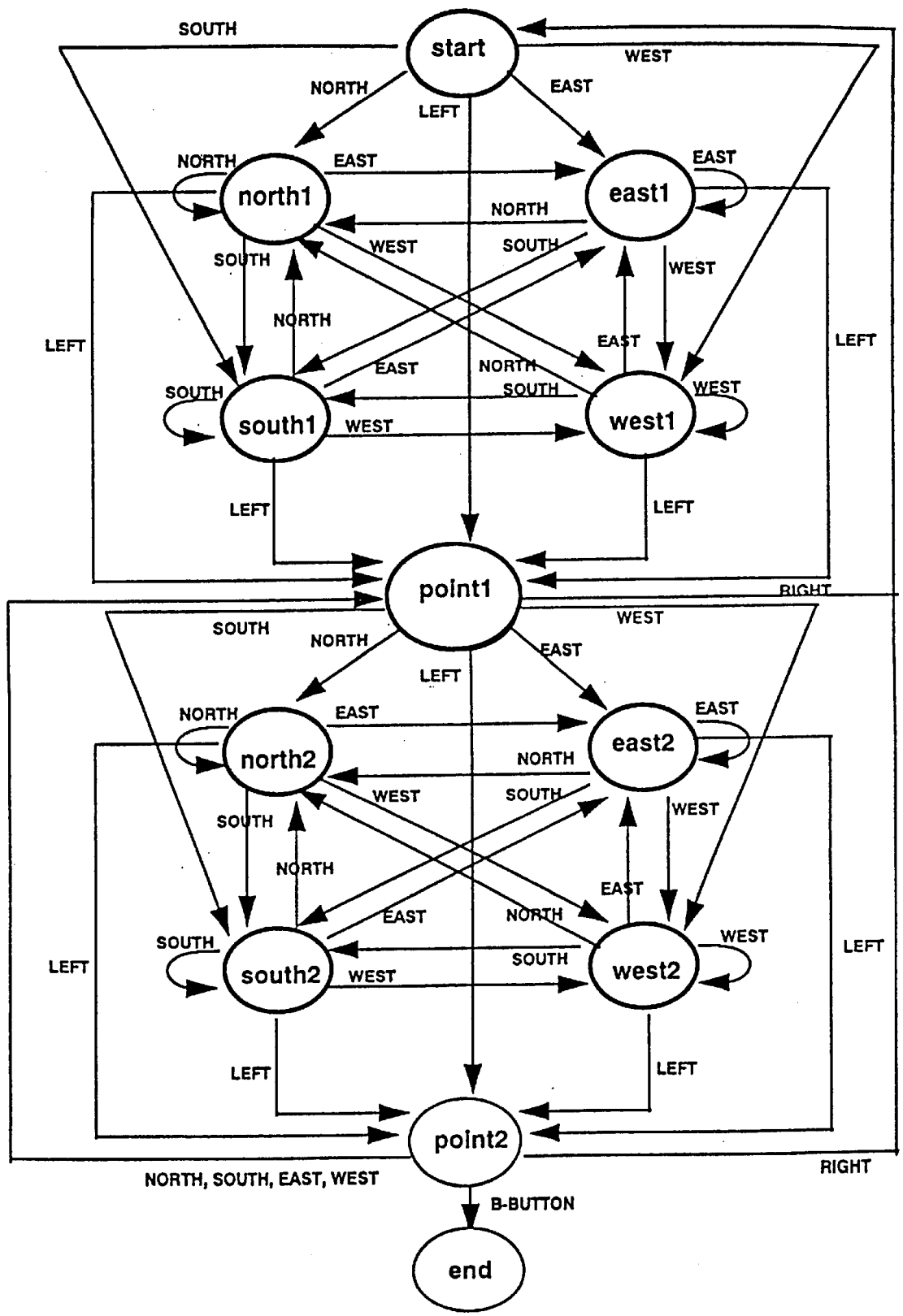
FIG. 3d is a flow chart illustrating the use of an alternative parse graph within a recursive call to the toplevel function to enforce a specific interaction sequence with a user.
Figure 3E:
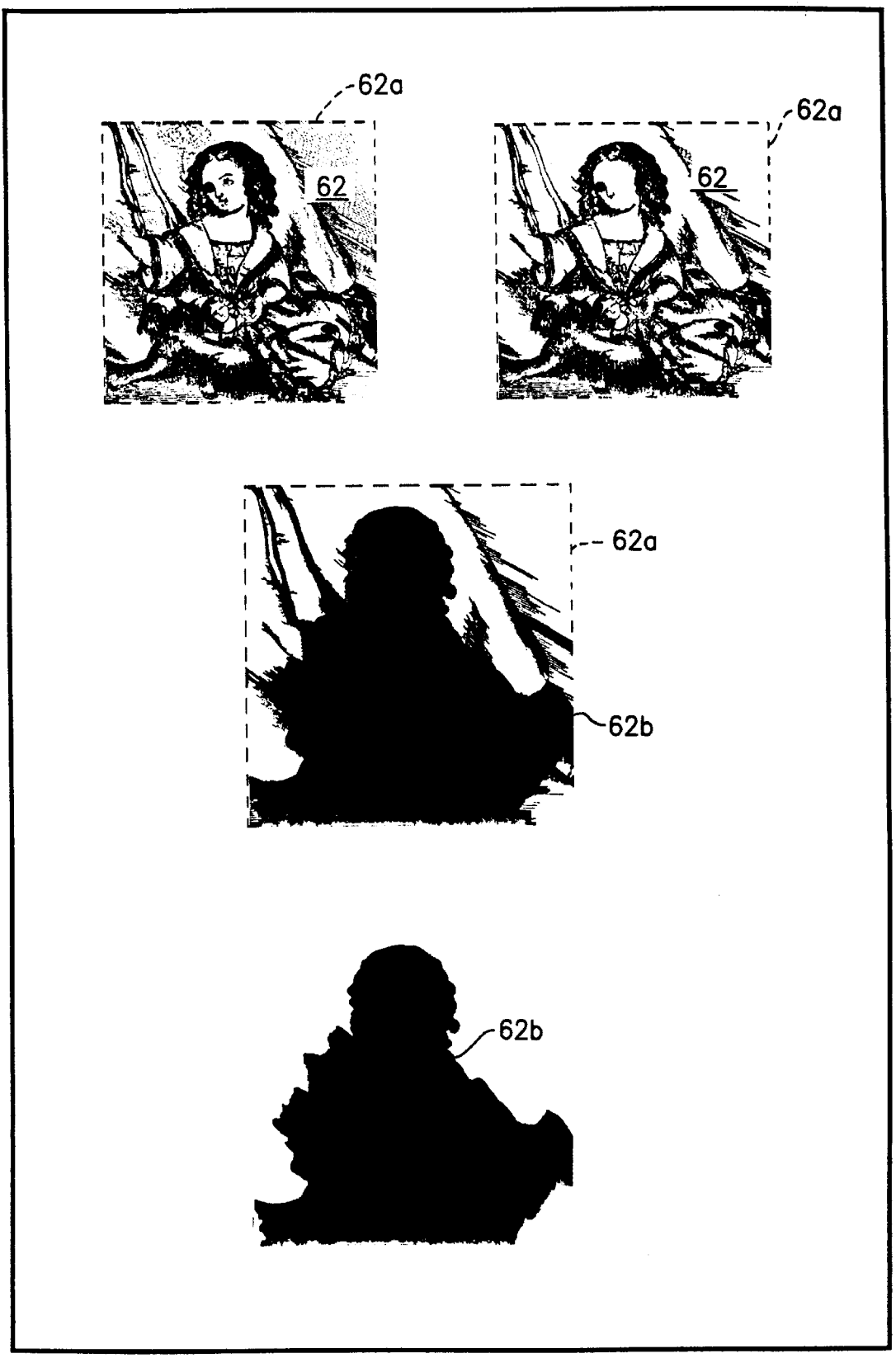
FIGS. 3e and 3f show how a mask is used to define a non-rectangular object icon.
Figure 3F:
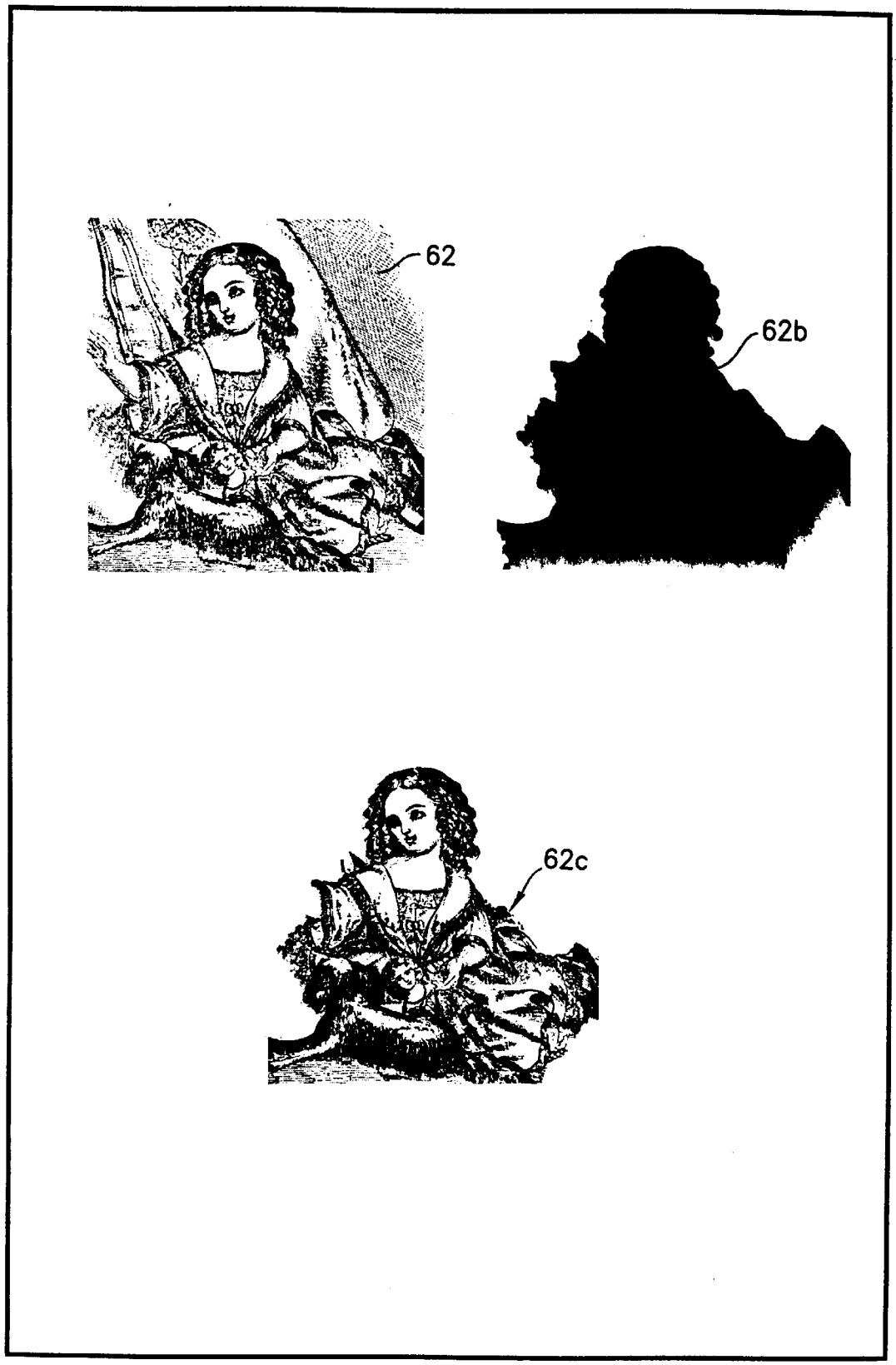

The define_icon command, as described here, is a example of the use of an alternative parse_graph within a recursive call to the toplevel to enforce a particular interaction sequence with a user. Referring now to FIGS. 3 and 3a–3d, an icon is defined by pressing the key combination which invokes the define_icon command (Left button+A button). This results in an animation of the character 22 raising his hand and holding a pin 60. At this point, only five commands from the user will be accepted, i.e. moving the character 22 left, right, up, or down to a location on the image 12 to position him at the corners of a sub-image 62 and pinning the pin 60 to the background image 12. Moving the character 22 invokes animation of walking in the direction selected as shown in FIG. 3a. Pinning the pin results in animation of the character's hand pushing the pin into the background to define a first corner of a rectangle as shown in FIG. 3b. A second pin 60a appears in the character's hand and is "attached" to the first pin by a resizable blinking rectangle 62a. The user moves the character to a second location and pins the second pin. The sub-image 62 contained within the rectangle 62a is thereby selected as an icon region. The flow of user interaction during the define_icon command is shown in FIG. 3d. As described below in the section entitled "Internal Procedures", the rectangular selection is masked to produce what appears to be a non-rectangular icon. FIGS. 3e and 3f show the steps in creating a mask for a non-rectangular icon. Connected regions or the image region 62 are identified radially outward from the center. Then the image is thresholded to remove noise. A mask 62b is formed around the included region The mask 62b is smoothed and overlaid with the image region 62 to form an icon 62c which is non-rectangular.

Data Structures

Information about directories, icons, the animated character, user-level commands, basic execution units, and animations are stored in a number of structures, lists and/or arrays as described below. Each data structure is described using C language style notation

The Directory Images

According to the presently preferred embodiment, pictorial information associated with directories is stored in a list or an array referred to generally as the "directory_image_map" which includes the following information:

| | |
|---|---|
| directory_image_map(directory).Icon_list | /*pointer to an Icon_list that contains all Icons*/ |
| directory_image_map(directory).overlay_Icons | /*pointer to an Icon_list that contains overlay Icons only*/ |
| directory_image_map(directory).image | /*full pathname of an Image file*/ |
| directory_image_map(directory).fileobject | /*full pathname of directory*/ |
| directory_image_map(directory).audio | |

A directory_image_map for a particular directory preferably includes the pathname to the background image, the pathname of the directory, a list of the icons (sub-images) in the directory image and a list of overlay icons (icons which are cross linked to other directories). The directory_image_map may also contain audio clips associated with the directory. Individual files stored in each directory on a storage device may be used to encode the directory_image_map information for that directory.

The Background Images

Each background image used to pictorially identify a directory is preferably stored in a data structure referred to generally as "background_image" which preferably includes the following information:

| | |
|---|---|
| background_image.bitmap | |
| background_image.size | /*For 2D Implementation this can be an (x,y) coord.*/ |
| background_image.palette | /*optional*/ |

The Icon Images

According to the presently preferred embodiment, information about icons and the file objects they are associated with is stored in a structure generally referred to as "icon". It records information that associates file objects in the operating system's file system with their pictorial representation in the interface. There are two basic types of information that are stored for each icon: pictorial information that is used to manage the pictorial representation of the file object and file object information such as the file handle and the handle to the default program for the associated file object. Miscellaneous information is also available for specific operations such as the creation of temporary icons and the management of non-hierarchical crosslinks that are available in the interface but may not be available in the underlying file system. The following information is preferably included in "icon":

| | |
|---|---|
| icon.location | /*point in background image coordinate system*/ |
| icon.size | /*point - in scale defined at the overall system level*/ |
| icon.bitmask | /*binary image same size as icon */ |
| icon.center | /*point in background image coordinate system*/ |

-continued

| | |
|---|---|
| icon.background_image | /*pointer to image that icon is contained in - this should be updated to refer to memory location when used*/ |
| icon.image | /*pointer to image that is icon image - used for overlay icons, e.g. generic icons. If null, then background image, size and location are used to derive icon image.*/ |
| icon.deleted? | /*TRUE if the icon and associated fileobject, if any, have been marked for deletion*/ |
| icon.temp? | /*If TRUE, this is a temporary icon. Temporary icons are overlay icons that exist as long as the directory is the current directory. They are deleted from the icon_list when a change_directory command executes. Alternatively the policy could be to delete these icons at startup time - i.e. to clear the field from the previous session.*/ |
| icon.overlay? | /*TRUE if this is an overlay icon*/ |
| icon.fileobject | /*full pathname for file object*/ |
| icon.fileobject_type | /*file object type - one of DIR or FILE*/ |
| icon.crosslink? | /*If TRUE, this is a non-hierarchical link in the interface and does not reflect the structure of the underlying file system.*/ |
| icon.default_program | /*full pathname for the default program*/ |
| icon.animation | /*optional: stored animation, which may include audio, for icon*/ |
| icon.icon_list | /*back pointer to the icon_list icon lives in*/ |

The icon_list is a list or array used to record pointers to icon datastructures. Its most important use is to record the icons associated with each particular file system directory in the directory_image_map. The actual implementation of this list is important for fast identification of an icon from screen location. In the preferred embodiment, a separate global variable icon list should be maintained that includes only those icons that are currently visible on the screen display, indexed by their location in the screen display coordinate system.

The Animated Character Model

Information about the animated character is stored as a list or an array referred to generally as character_model and preferably includes the following information:

| | |
|---|---|
| character_model | /*all coordinates in terms of background image coordinate system*/ |
| character_model.size | /*bounding rectangle for character image in all animation frames*/ |
| character_model.cursor.hotspot | |
| character_model.cursor.size | |
| character_model.center | |
| character_model.position | /*one of a set of values that describe character position*/ /*for simplicity we restrict the set to the four values {LEFT, RIGHT, UP, DOWN}*/ |
| character_model.collected_objects | /*list of Icons*/ |

The character_model is used to maintain information about the location and position of the character and cursor throughout the system during a session. It is updated by play_animation (described below) to match the last frame of each animation played. The character model is used to calibrate animations and register images of the character across animations. It is also used to track the cursor. It also is used to maintain the list of references to file objects which the user wishes to collect and have immediate access to during a session.

The User-Level Command Scripts

Information about the user-level commands is stored in a list or an array referred to generally as command_script and preferably includes the following information:

| | |
|---|---|
| command_script.function | /*pointer to executable code*/ |
| command_script.options_arg | /*optional - parameters for execution*/ |

The command_sript is used to maintain a pointer to the executable code for user-level commands and the system-wide parameters for each command.

The User-Level Command Map

Command scripts are stored in an array or list data structure. The data structure is used to index and retrieve command scripts by making reference to the command code of that command.
command_scripts(command_code).command_script /*pointer to command script*/

The Basic Execution Units

Runtime parameters of the basic execution units are stored in lists or arrays referred to generally as beu which preferably includes the following information:

| | |
|---|---|
| beu.command_code | /*identifies user-level command and animation*/ |
| beu.icon | /*context argument for instantiated basic execution unit*/ |
| beu.duration | /*for repeated execution of a single user-level command*/ |

The Animation Scripts

According to the invention, information about animations is stored in arrays or lists referred to generally as script which preferably include the following information:

| | |
|---|---|
| script.ID | /*identifier for this animation*/ |
| script.command_class | /*backlink to command_class*/ |
| script.command_code | /*backlink to command_code*/ |
| script.animation_selector | /*backlink to animation_selector - used for epilogue animations*/ |
| script.n_of_frames | |
| script.desired_frame_rate | /*frames per second*/ |
| script.palette | |
| script.merge_frame | /*only in char animations - frame # to begin merge of icon animation*/ |
| script.merge_distance | /*only in char - this + char_center should = icon center in merge frame*/ |
| script.loop_startframe | /*start of loop if this frame is the start of an animation playback loop*/ |
| script.loop_endframe | /*used only if loop_start is not NULL*/ |
| script.loop_#iterations | /*used only if loop_start is not NULL*/ |
| script.cursor_in_last_frame.location | /*only in char animations - coord relative to origin at frame center*/ |
| script.cursor_in_last_frame.size | /*only in char animations - point*/ |

-continued

| | |
|---|---|
| script.char_initial_position | /* one of a set of values that describe character position*/ |
| script.char_final_position | /*for simplicity we restrict the set to four values that describe the quadrants of a circle e.g. {LEFT, RIGHT, UP, DOWN}*/ |
| script.frame(i).bitmap | |
| script.frame(i).size | /*point - system standard resolution*/ |
| script.frame(i).anchor | /*point in animation coordinate system . . . starts at frame 1 (0,0)*/ |
| script.frame(i).to_next | /*vector increment to next frame's anchor coord - used mainly for loops*/ |
| script.frame(i).audio | /*pointer to audio segment synced to this frame*/ |
| script.frame(i).center | /*point that is normally the character center in a char animation or icon center in an icon ani - coord relative to origin at frame anchor used to register animations with previous scenarios*/ |
| script.frame(i).selection_arg.center | /*coord relative to origin at frame anchor, may include orientation info*/ |
| script.frame(i).selection_arg.bitmask | /*used for fancy masking of selection arg image*/ |

Each animation script requires a header which, in addition to providing information about standard animation parameter values, associates the animation to a user-level command, enables cursor tracking, and enables calibration with other animation sequences so that animation sequences can be appended to one another while maintaining smooth motion. Information about how an icon animation should be merged into a character animation are maintained for the character animations. Header variables that describe animation looping behavior are available for runtime iterations according to user determined criteria.

In addition to the header information, each frame of the animation includes information about the location of the frame relative to other frames in the same animation, audio synchronization information, summary information about the primary actor's (character or icon) center of gravity (registration point), and information for merging of independent bit maps (normally for visualization of selection arguments in character animations).

Setting and tracking of cursor will depend on the user command. For example, if the character is kicking an icon, the foot will be the cursor. If the character is pointing to an icon, the hand will be the cursor. Since the cursor is a component of the animation it can be changed and tracked by evaluating the animation. In the preferred embodiment, the function find_icon (described below) uses the animation script to identify the location of the cursor at the end the prologue animation. This also helps avoid problems in calibrating the animations.

Figure 4D:
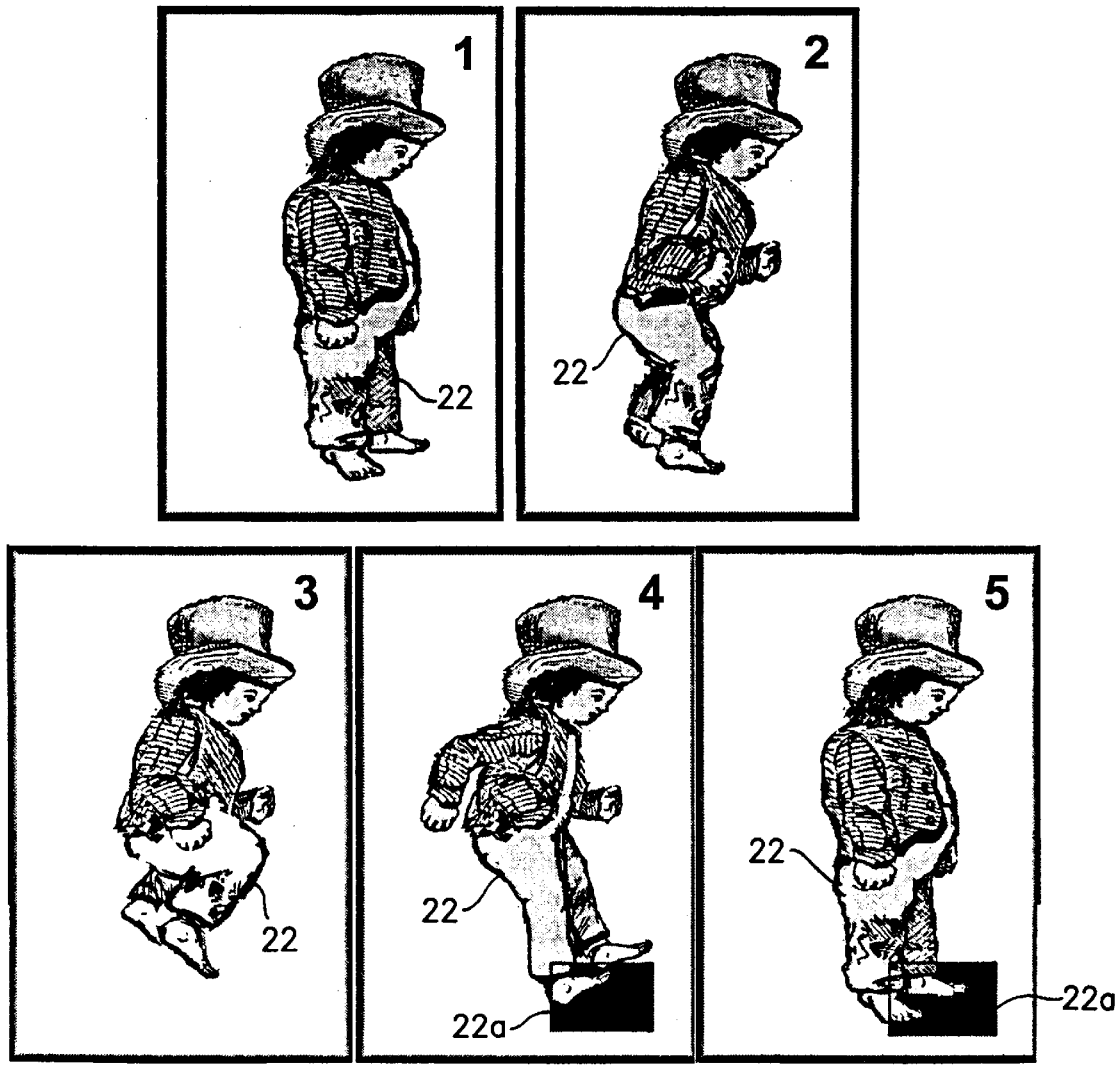
FIG. 4d shows an exemplary sequence of character prologue animation for the command change_directory.

FIGS. 4, and 4a–4d show examples of prologue and epilogue animations. FIG. 4d shows cursor placement in the prologue animation for the change_directory command. The rectangular mask 22a is used to indicate the region of the cursor hot spot. The cursor is defined only in the last frame of the prologue animation. For example, in FIG. 4d. the cursor location is determined by the rectangle 22a bounding the soles of the character's feet at the pointing of landing from a jump. Since the cursor location is recorded in the header information of each prologue animation, animations for different commands can define the cursor to be at different locations. Commands that do not accept a context argument will have an undefined or NULL cursor_in_last_frame.location and $cursor_{=13}$ in_last_frame.size. For example, the animations for the commands illustrated in FIGS. 4 and 4a through 4c, do not accept a context argument and there is no need to define a cursor region. Similarly, epilogue animations and transition animations, e.g. the one shown in FIG. 5a., need not have cursor regions defined.

The Selection Argument

When an object is selected, information about the selected object is stored in a list or an array referred to generally as selection_arg which preferably includes the following information:

| | |
|---|---|
| selection_arg.location | /*may be different from the original icon.*/ |
| selection_arg.bitmap | /*may be different from the original icon.*/ |
| selection_arg.center | |
| selection_arg.icon | |
| selection_arg.size | |

The selection argument is required for user-level commands which take two arguments. In addition to a pointer to the original icon which was selected, the selection argument has its own pictorial representation and location. FIG. 4 shows the selection argument overlaid on a character animation.

The Command Animation Mapping

The command animation maps are lists or arrays which maintain the association between user-level commands and animations which play before and after the execution of the commands. Animations are recorded either as pointers to files that contain animation scripts or as pointers to executable code and parameters that can be used to generate an animation at runtime. The command animation maps generally include prologue_animations and epilogue_animations and preferably include the information listed below:

prologue_animations(command_code,selector) /*for prologue animations selector=NULL*/
prologue_animations(command_code,selector).icon
prologue_animations(command_code,selector).icon.animation_scriptfile
prologue_animations(command_code,selector).icon.generating_function
prologue_animations(command_code,selector).icon.gf_parameters
prologue_animations(command_code,selector).icon.next_animation_list
prologue_animations(command_code,selector).icon.previous_animation_list
prologue_animations(command_code,selector).char
prologue_animations(command_code,selector).char.generating_function
prologue_animations(command_code,selector).char.gf_parameters
prologue_animations(command_code,selector).char.animation_scriptfile
prologue_animations(command_code,selector).char.next_animation_list
prologue_animations(command_code,selector).char.previous_animation_list epilogue_animations(command_code,execution_result)
epilogue_animations(command_code,execution_result).icon
epilogue_animations(command_code,execution_result).icon.animation_scriptfile
epilogue_animations(command_code,execution_result).icon.generating_function
epilogue_animations(command_code,execution_result).icon.gf_parameters
epilogue_animations(command_code,execution_result).icon.next_animation_list
epilogue_animations(command_code,execution_result).icon.previous_animation_list
epilogue_animations(command_code,execution_result).char
epilogue_animations(command_code,execution_result).char.generating_function
epilogue_animations(command_code,execution_result).char.gf_parameters
epilogue_animations(command_code,execution_result).char.animation_scriptfile
epilogue_animations(command_code,execution_result).char.next_animation_list
epilogue_animations(command_code,execution_result).char.previous_animation_list The next_animation_list and previous_animation_list are optional information. If used, they allow animations to be linked in a graph of animations. The variables next_animation_list and previous_animation_list are the forward and back links in the graph of animations. The graph of animations can be used to implement a specialized technique for animation calibration which is discussed below in the section entitled "Internal Procedures".

System Control Data Structures

The following data structures are used for system control and sequencing of basic execution units.

Input signal mapping is stored in a data structure referred to generally as keycode_grammer. This is a finite grammar that associates each valid input sequence with a keycode-identical set. In the preferred embodiment, this declarative representation is used by a standard type of lexical parser to return the appropriate command_class given any valid input sequence. The following information is contained in keycode_grammer:

| | |
|---|---|
| keycode_grammer.input_sequence | /*string with coding dependant on input device*/ |
| keycode_grammer.keycode_identical_command_set | /*lost of command codes*/ |

A grammar that contains user-level commands is stored in a data structure referred to generally as a parse_graph. In the presently preferred embodiment, the parse_graph is a finite state machine that records valid sequences of user-level commands. This is used to place restrictions on certain combinations of commands, particularly in nested animation sequences that are used to obtain specific kinds of information from a user (see the parse graph for define_icon for an example in FIG. 3d). The parse_graph includes the following information:

| | |
|---|---|
| parse_graph | /*Each state has a single command code associated with it. A command code may be associated with many states.*/ |
| parse_graph.state | /*identifier or handle of state*/ |
| parse_graph.state.next_states | /*list of pointers to next states*/ |
| parse_graph.state.command_code | /*command_code that is associated with state*/ |

The Command Buffer

An array of pointers to basic execution units can be used to implement the command buffer.
command_buffer(index).beu /*pointer to a basic execution unit*/

User-Level Commands

User-level commands are directly invoked by the user of the system. In the presently preferred embodiment, command invocation is button-based using the game pad controller described above. Each command is associated with a small number of input keys which are either pressed together or in sequence. Each command is made up of a single basic execution unit which includes a prologue animation, the command script, and one or more epilogue animations. When the user invokes a command by pushing the correct buttons, the prologue animation will play, the command script is executed, and one of the epilogue animations plays.

According to the presently preferred embodiment, a command may have up to two arguments. The arguments to a command must be icons, as defined in this invention. Arguments for a command are either preselected by a previous command or are determined by the location of the cursor hotspot on the display screen. Although the implementation is simpler if the cursor hotspot is observed prior to the start of a basic execution unit, in the preferred embodiment, the location of the cursor hotspot is observed after the prologue animation has played. By using the prologue animation to determine the cursor location, better coordination between the character and icons can be achieved. This is especially true when the cursor hotspot can be associated with various parts of the character's body depending upon the command invoked.

In the presently preferred embodiment, a number of commands can be associated with identical signals (or signal sequences) from an input device such as a keyboard and mouse, a gamepad controller, or an infrared remote controller. When more than one command is assigned to a single user input (or sequence of inputs), the commands are uniquely distinguishable by the existence of arguments, the type of the arguments, or by information encapsulated in the arguments. Overloading of button-based input signals is useful because it helps to limit the number of button signals which must be learned by a user. For example, in the presently preferred embodiment, change_directory, change_directory_to_ancestor, run_program, and run_default_program share the same input signal but are distinguishable as follows:

| | |
|---|---|
| change_directory_to_ancestor | icon is on overlay icon that references a directory |
| change_directory | icon references a directory |
| run_default_program | one icon argument & icon has default program defined |

| | |
|---|---|
| run_program | two icon arguments & one is an executable file |

Overloading of button-based input signals is preferably implemented by grouping user level commands into keycode-identical sets, many of which have a single member. All the commands in a keycode-identical set are assigned to the same input signal or sequence of input signals. Input signals from the input device are parsed to return the keycode-identical set associated with that signal. The keycode_identical_command_set variable is used to reference the set of user-level commands assigned to that set.

Each user level command has a unique prologue animation and a unique command_code. In some cases more than one user level command may share the same executable command_script but still exhibit a unique animation. For example, change_directory and change_directory_to_ancestor have different command codes and prologue animations but share the same executable command_script.

The keycode_identical_command_set and the arguments to the command are passed to a dispatcher process which determines which of the commands in the class have been invoked by the user. The command_code returned by the dispatcher is used to retrieve the animations associated with the command from the prologue_animations and epilogue_animations maps. In addition the command_code is used to retrieve a pointer to the function used to execute the command from the user_level_commands_map.

Three types of user-level commands are provided in the presently preferred embodiment of the invention. The first type are commands which are roughly equivalent to the commands available in the operating system (OS) in use. The second type are commands used to create and maintain the pictorial representation of file objects. The third type are utility commands which are used to change and maintain the state of various data structures used in the interface.

The following detailed descriptions of commands are illustrative of the type of commands and style of animation sequences that are provided by the invention. Other commands and/or animations can be substituted for or added to those included here. There are a number of general principles, however, which should be used when defining commands and associated animations.

1. A small number of keystrokes or button presses (e.g. one or two) should be required for each command invocation.
2. The same invocation keystrokes should be shared among as many commands as is possible by using arguments to distinguish among commands.
3. Animations should be defined to reflect differences in commands and convey this information to a user. Normally each command will have a unique prologue animation that serves as a form of echo input to the user. Several epilogue animations can be defined for each user-level command. Epilogue animations are normally used to indicate the result of a command execution to the user. The specific epilogue animation that is played when a command has been executed is generally dependant upon the value returned by the command. Epilogue animations can also be used to indicate errors to the user. Therefore, each possible result of a command should have its own epilogue animation.

Operating System Equivalent Commands

These commands are used to interface with functions provided by the underlying operating system. They provide the user with an alternative interface to the existing operating system functionality. For example, operating systems such as DOS, OS/2, and Unix all provide a command such as DIR which displays a listing of the text string names of the file objects in a file system directory. The user of this invention will get similar functionality using the display_directory command which controls the motion of an animated character to scroll images which display the pictorial representation of file objects in a directory. Each of the commands listed below provide an alternative interface to common functions that are available in most operating systems today. Other operating system equivalent commands may be defined as needed to match the functionality provided by the underlying operating system.

change_directory(icon refers to directory)
/* Changes the current directory. */
change_directory_to_ancestor (icon refers to a directory and icon is of type overlay_icon)
/* changes the current directory to a direct ancestor of the current directory */
copy_file(icon refers to a file) /* Copies the file associated with the icon into the current directory */
create_directory(no icon or icon is not linked) /* Creates a subdirectory of the current directory */
delete_file_object(icon refers to a file object) /* Deletes the file object associated with the icon. */
display_directory( ) /* Displays the icons associated with file objects in the current directory by scrolling the directory's image while showing the movement of an animated character. */
expunge_deleted( ) /* Expunges the file objects that have been deleted with the delete command. */
move_file(icon refers to a file)
/* Moves the file associated with the icon into the current directory and removes it from it's previous directory. */
run_default_program( icon has default_program defined)
/* Executes the default program associated with the icon, using the file object associated with the icon as input. */
run program(icon & selection arg, selection arg is executable
/* Executes the program identified by the selection argument file object, using the icon's file object as input. */

Appendix B on Microfiche shows pseudocode and describes sample prologue and epilogue animations for each of the above commands.

Pictorial Object Commands

These commands are used to create and maintain pictorial representations of file objects in the underlying operating system's file system. They act like extensions to the operating system in that they provide an alternative method to identify and represent operating system entities. They allow a user to dynamically modify the interface by adding and linking images and icons at runtime and as part of normal interaction with the computing system.

copy_icon(icon)
/* Makes a copy of an icon and installs the copy in the interface in the current directory. */
define_default_program(icon)
/* Defines a default program for a file that is executed when run_default_program is invoked with the file as input */
define_icon ()
/* Creates an icon from the current directory's background image and installs the icon in the interface. */
delete_icon (icon)
/* Undefines and removes the icon from the interface */
link directory_image(icon)
/* Links an image file to the directory. */ link icon(icon, fileobject)
/* Links an icon to a fileobject in the underlying operating system. */
unlink_directory_image ( icon has default_program defined)
/* Unlinks an image file from a directory in the directory_image_map. */
unlink_icon( icon)
/* Unlinks an icon from a fileobject. Icon definition remains part of interface. */

Appendix C on Microfiche shows pseudocode and describes sample prologue and epilogue animations for each of the above commands.

Interface Utility Commands

These commands are used to change and maintain the runtime state of various interface data structures. Some of the commands allow a user to collect references to file objects and use these references as input to later commands. Others provide control over the setting and resetting of the selection argument that is used as input to many other commands. Some of the commands change system settings that affect the way icons appear. The interface utility commands listed here provide examples of various classes of functionality that can be implemented with this type of command. Additional commands of this type can be defined to set defaults for system behavior or variables, to alter the look-and-feel of the interface, or to access data structures defined in the underlying operating system that are not otherwise accessible through the interface.
collect_file_object (icon)
/* Allows the user to collect references to file objects for later use. */
collect_selection_argument ( )
/* Allows the user to collect a references to the selection argument's file object for later use. */
makeicons_invisible( )
/* Undoes a previous make_icons_visible command so that icons are restored to their original appearance as portions of the unaltered background image.*/
make_icons_visible( )
/* Causes those portions of the background image that have been defined as icons to become emphasized so that they are clearly visible and identifiable as icons. */
quit ()
/* Causes the interface program to terminate normally. */
reset_selection_argument ( )
/* Sets the selection argument to NULL. */
select_collected_object ( )
/* Allows the user to set the selection argument to a collected object. */
select_files_as_collected objects ( )
/* Allows a user to access files that have not been installed in the interface. Generic icons for files selected by a user are created and added to the set of collected objects. */
set_selection_argument (icon)
/* Sets the selection argument to the icon. */
unload_collected_object ( )
/* Allows the user to select a collected object and place it on the background in the current directory */

Appendix D on Microfiche shows pseudocode and describes sample prologue and epilogue animations for each of the above commands.

Internal Procedures

The "internal procedures" are used to implement the system functions. They are not available to a user of the interface nor are they available at an API (Application Programming Interface) level. A list of internal procedures is provided in Appendix E on Microfiche. For each internal procedure, the procedure prototype is given along with a description of the procedure's actions. In some cases, detailed pseudocode is provided. For example, the process_input procedure processes input signals and cursor location to determine the command code, the icon, the animation_selector, and the duration, if applicable, for the next command. The primary task of this procedure is to identify repetitions of command invocations and to manage the mapping of inputs to command codes. It calls the procedure parse_input to handle low level parsing of input signals and the procedure commands_dispatcher to handle the identification of commands that share an input signal but are distinguishable by the type of argument. For many commands, performance can be improved by processing a repeated sequence of invocations as a single unit. For example, a single invocation of a character motion command causes the animated character to move a tiny distance in the specified direction. Generally many repetitions of a motion command are issued in sequence. In addition, animation for motion is amenable to playback in a loop. For these reasons, a duration argument is provided for many of the commands. Keycodes are collected until the direction of motion changes, a maximum acceptable pause threshold is reached, or motion stops. The duration of the sequence can then be used to construct the animation for character motion which can then be played in its entirety prior to collecting the next input.

The process_input procedure takes input from keycode_grammar, character_model, and selection_arg and returns the command_code, icon, duration, and move_vector. In addition, the process_input procedure uses the following data stores:
keycode_grammar.command_set, input_buffer, repeat_threshold, and sequenced_set (set of commands for which repeated invocation is handled as a single invocation of extended duration). Sample pseudocode for the process_input procedure is listed below.

```
begin procedure process_input:
    duration = 0
    do
        keycode_grammar_command_set = lexical_parse
        (keycode_grammar)
        (command_code, icon) = find_icon
        (keycode_grammar_command_set,character_model,
            selection_arg)
        /*find_icon may return NULL*/
        duration = duration + 1
    until command_code not in sequenced set or duration =
    repeat_threshold
        or command_code changes
    return (command_code, duration, icon)
end procedure process_input:
```

Installation and System Infrastructure

As mentioned above, the pictorial interface according to the invention is designed to support easy installation of alternative animations and input signal mappings for commands. This allows the system to be used with alternative characters, character behaviors, and input devices by reading different data into the system data structures. For example, by loading the command_animation_maps with alternative animations, different characters with different behaviors for each command can be depicted without altering the underlying system code. In addition, the icon animation generation functions may vary in different system versions. Moreover, the startup function can be written to allow user selection of a character personality and accompanying animations at runtime, if a variety of command_animation_maps are present on a single system. When a new character, input device or command set is installed, a pointer to the files that are read to define the directory_image_map, keycode_grammar, prologue_animations, epilogue_animations, or command_scripts are written to a known file which is read at startup time.

According to the presently preferred embodiment, a "super-root" directory image and icons are created during installation. Installation software determines which devices (particularly storage devices) are present and generates an image plus icons to represent a view of all the devices in the system. This is called the super-root directory. Normally the start-up directory is set to be the root directory of the boot device. However the user has access to the device level view that is created by the interface software as the super-root directory by changing directory to ancestor from the root directory. One of the benefits of the creation of a super-root is that it enables the user to install an image for the root directory in the usual way by invoking a link_dir_image command.

During installation, default images and icons are linked to file objects that are defined in the file system. For example, solid color background images can be linked to each directory defined in the file system and generic icons (e.g. golden bricks and diamond crystals) can be linked to each file object. In the preferred embodiment, this installation task should be a user option. Moreover, the user will be given an opportunity to select the directories and files that are to be linked to the interface. This option will enable the user to protect or hide files and directories that they do not wish to be available through the interface.

At startup time, a known startup file is read to determine the pathnames of the files in which the information for the directory_image_map, keycode_grammar, prologue_animations, epilogue_animations, and command_scripts is stored. These files are then read to load the mapping data structures into memory so that pointers to the associated animations script files and command scripts are available. Upon completion of the startup procedure, the toplevel is called. Pseudocode for the startup procedure and the toplevel is listed below:

```
begin procedure startup:
/* find pathnames for files with mapping data structures */
        (directory_image_map, keycode_grammar, prologue_animations,
epilogue_animations, command_scripts, startup_directory, startup_animation)
            = read_resource_file()
/* set global variables */
        load directory_image_map  /* load means read from disk */
        load keycode_grammar      /* assume load resets variable */
        load prologue_animations  /* it is now pointer to the ds in memory */
        load epilogue_animations
        load command_scripts
        load startup_directory
        load startup_animation
        character_model = initialize_character_model()
        video_viewport = initialize_video_viewport()
        current_directory = startup_directory
        background image = directory_image_map(current_directory).image
        icon_list = directory_image_map(current_directory).icon_list
        selection_arg = NULL
/* set data structures for initial call to toplevel */
        load parse_graph
        load keycode_grammar
        command_buffer = initialize_command_buffer()
        significant_commands = NULL
        (character_model, video_viewport.anchor, selection_arg) =
                                            play_animation(startup_animation)
/* call toplevel */
        top_level(parse_graph, keycode_grammar, command_buffer,
significant_commands)
end procedure startup:
begin procedure toplevel:
        current_state = START    /* initialize to start state in parse_graph */
        do until current_state is a terminal state in parse_graph
            if command_buffer is empty
                (command_code, icon, duration) =
                        process_input(keycode_grammar, character_model,
                                                    selection_arg)
            else get (command_code, icon, duration)
                from command_buffer
            if is_next_state?(current_state, command_code, parse_graph)
/* prologue animation */
                animation_selector = NULL
                char_animscript = get_animation( command_code,
                                              prologue_animations,
                                              type = CHAR,
                                              animation_selector,
                                              icon = NULL)
                icon_animscript = get_animation( command_code,
                                              prologue_animations,
```

-continued

```
                                        type = ICON,
                                        animation_selector,
                                        icon)
                    calibrator = generate_calibration_animation(move_vector,
                                                    character_model.position,
                                        char_animscript.char_initial_position)
/* by convention use duration to set up a loop in the prologue animation only */
                    char_animscript = make_anim_loop(char_animscript,
                                                    duration)
            /* calibrate animation with current position and merge the char and icon animations */
                    prologue_animation = make_animation( char_animscript,
                                                    icon_animscript,
                                                    calibrator,
                                                    character_model,
                                                    icon,
                                                    selection_arg)
                    (character_model, video_viewport, selection_arg) =
                                                    play_animation(prologue_animation)
            /* command execution - side effects may cause change in background image, character model,
etc */
                    comscript = command_scripts(command_code)
                    execution_result = execute_command(comscript, icon,
selection_arg)
            /* epilogue animation */
                    char_animscript = get_animation( command_code,
                                                    epilogue_animations,
                                                    type = CHAR,
                                                    execution_result,
                                                    icon = NULL)
                    icon_animscript = get_animation( command_code,
                                                    epilogue_animations,
                                                    type = ICON,
                                                    execution_result,
                                                    icon)
                    epilogue_animation = make_animation( char_animscript,
                                                    icon_animscript,
                                                    calibrator = NULL,
                                                    character_model,
                                                    icon,
                                                    selection_arg)
                    · (character_model, video_viewport, selection_arg) =
                                                    play_animation(epilogue_animation)
                    if command_code is on list of significant commands
                            append execution_result to significant_results
                    update current_state in parse_graph
                end if
            end do
            return significant_results
end procedure toplevel:
```

There have been described and illustrated herein a user definable pictorial interface for accessing information in an electronic file system. While particular embodiments of the invention have been described, it is not intended that the invention be limited thereto, as it is intended that the invention be as broad in scope as the art will allow and that the specification be read likewise. Thus, while particular commands have been disclosed, it will be appreciated that other commands could be utilized. Also, while particular data structures have been shown, it will be recognized that other types of data structures could be used with similar results obtained. Moreover, while particular configurations have been disclosed in reference to processes and procedures, it will be appreciated that other configurations could be used as well. Furthermore, while the invention has been disclosed with reference to specific pseudocode, it will be understood that different code can achieve the same or similar function as disclosed herein. It will therefore be appreciated by those skilled in the art that yet other modifications could be made to the provided invention without deviating from its spirit and scope as so claimed.

What is claimed is:

1. A pictorial interface for accessing information in an electronic file system having a display screen and an input device, said interface comprising:

a) at least one pictorial image displayable on the display screen;

b) means for associating said at least one pictorial image with a first group of files;

c) means for defining a plurality of sub-images as portions of said at least one pictorial image, wherein said means for defining enables selection of substantially any non-predefined portion of said at least one pictorial image and designation of it as a sub-image; and d) means for associating each of a plurality of the files in the first group of files with individual sub-images of said plurality of sub-images.

2. A pictorial interface according to claim 1, wherein:

at least some of said plurality of sub-images are non-rectangular.

3. A pictorial interface according to claim 1, wherein:

said means for associating at least some of the files in the first group of files with individual sub-images of said plurality of sub-images includes cursor means to define corners of a rectangle circumscribing the sub-image to be associated with a file.

4. A pictorial interface according to claim 3, wherein:
said means for associating at least some of the files in the first group of files with individual sub-images of said plurality of sub-images includes masking means for masking portions of the rectangle circumscribing the sub-image to produce a non-rectangular icon.

5. A pictorial interface according to claim 1, further comprising:
   e) means for associating at least one of the sub-images of said plurality of sub-images with a second group of files.

6. A pictorial interface for accessing information in an electronic file system having a display screen and an input device, said interface comprising:
   a) at least one pictorial image displayable on the display screen;
   b) means for creating a group of new files;
   c) means for associating said at least one pictorial image with said group of new files;
   d) means for defining a plurality of sub-images relative to said at least one pictorial image, wherein said means for defining enables selection of substantially any non-predetermined portion of said at least one pictorial image and designation of it as a sub-image;
   e) means for associating each of a plurality of the files in said group of new files with individual sub-images of said plurality of sub-images.

7. A pictorial interface according to claim 6, further comprising:
   f) means for animating at least some of said plurality of sub-images.

8. A pictorial interface for accessing information in an electronic file system having a display screen and an input device, said interface comprising:
   a) at least one pictorial image displayable on the display screen, said pictorial image containing a plurality of sub-images;
   b) means for associating at least some of the files in the first group of files with individual sub-images of said plurality of sub-images;
   c) an animated character image displayable on the display screen, said animated character image being overlaid on said pictorial image and being capable of a plurality of animated actions; and
   d) means for moving said animated character image relative to said pictorial image in response to user input.

9. A pictorial interface according to claim 8, further comprising:
   e) means for scrolling said at least one pictorial image in response to movement of said animated character image.

10. A pictorial interface according to claim 8, further comprising:
    e) means for generating a transition animation of said animated character image, said transition animation starting with a last frame of one of said plurality of animated actions and ending with a first frame of another of said plurality of animated actions.

11. A pictorial interface for accessing information in an electronic file system having a display screen and an input device, said interface comprising:
    a) at least one pictorial image displayable on the display screen;
    b) means for defining a region of said pictorial image as a sub-image; and
    c) means for associating at least one of the files in the file system with said sub-image, wherein
       said means for defining a region includes means for automatically generating and compiling program code containing a subimage definition and association, said program code providing access to said at least one of the files when said program code is run.

* * * * *